US009178218B2

(12) United States Patent
Choi et al.

(10) Patent No.: US 9,178,218 B2
(45) Date of Patent: Nov. 3, 2015

(54) HYPER-BRANCHED POLYMER, ELECTRODE AND ELECTROLYTE MEMBRANE INCLUDING THE HYPER-BRANCHED POLYMER, AND FUEL CELL INCLUDING AT LEAST ONE OF THE ELECTRODE AND THE ELECTROLYTE MEMBRANE

(75) Inventors: Seong-woo Choi, Yongin-si (KR); Cheol-hee Ahn, Seoul (KR); Jung-ock Park, Yongin-si (KR); So-young Park, Daegu (KR)

(73) Assignees: SAMSUNG ELECTRONICS CO., LTD. (KR); SNU R&DB FOUNDATION (KR)

( * ) Notice: Subject to any disclaimer, the term of this patent is extended or adjusted under 35 U.S.C. 154(b) by 732 days.

(21) Appl. No.: 13/019,591

(22) Filed: Feb. 2, 2011

(65) Prior Publication Data

US 2011/0195338 A1    Aug. 11, 2011

(30) Foreign Application Priority Data

Feb. 9, 2010    (KR) ........................ 10-2010-0012023

(51) Int. Cl.
| | |
|---|---|
| *H01M 4/86* | (2006.01) |
| *H01M 8/10* | (2006.01) |
| *C08G 18/32* | (2006.01) |
| *C08G 18/38* | (2006.01) |
| *C08G 18/72* | (2006.01) |
| *C08G 18/73* | (2006.01) |
| *C08G 18/74* | (2006.01) |
| *C08G 18/75* | (2006.01) |
| *C08G 18/76* | (2006.01) |
| *C08G 18/77* | (2006.01) |
| *C08G 18/71* | (2006.01) |

(52) U.S. Cl.
CPC ............ *H01M 4/8668* (2013.01); *C08G 18/329* (2013.01); *C08G 18/3275* (2013.01); *C08G 18/3287* (2013.01); *C08G 18/3293* (2013.01); *C08G 18/3829* (2013.01); *C08G 18/712* (2013.01); *C08G 18/73* (2013.01); *C08G 18/74* (2013.01); *C08G 18/75* (2013.01); *C08G 18/758* (2013.01); *C08G 18/76* (2013.01); *C08G 18/7614* (2013.01); *C08G 18/7657* (2013.01); *C08G 18/7671* (2013.01); *C08G 18/7678* (2013.01); *C08G 18/77* (2013.01); *H01M 8/103* (2013.01); *H01M 8/1027* (2013.01); *H01M 8/1032* (2013.01); *H01M 2008/1095* (2013.01); *H01M 2300/0025* (2013.01); *H01M 2300/0082* (2013.01); *Y02E 60/521* (2013.01)

(58) Field of Classification Search
USPC .......... 204/291, 294; 429/400, 479, 492, 530; 525/424, 454; 528/70, 72, 73, 74, 75, 528/85

IPC ........ C08G 18/3275,18/3287, 18/329, 19/3293, C08G 18/73, 18/74, 18/75, 18/758, 18/76, C08G 18/7614, 18/7657, 18/7671, 18/7678, C08G 18/77; H01M 4/8668, 8/1027, 8/103, H01M 2008/1095, 2300/0025, 2300/0082
See application file for complete search history.

(56) References Cited

U.S. PATENT DOCUMENTS

| | | | |
|---|---|---|---|
| 4,772,678 | A | 9/1988 | Sybert et al. |
| 5,723,086 | A | 3/1998 | Ledjeff et al. |
| 2005/0256296 | A1 | 11/2005 | Kiefer et al. |
| 2006/0211844 | A1 | 9/2006 | Kim et al. |
| 2007/0020507 | A1 | 1/2007 | Kim et al. |
| 2007/0184323 | A1 | 8/2007 | Lee et al. |
| 2008/0145743 | A1 | 6/2008 | Choi et al. |
| 2009/0098437 | A1 | 4/2009 | Choi et al. |
| 2009/0117436 | A1 | 5/2009 | Choi et al. |
| 2010/0159347 | A1 | 6/2010 | Choi et al. |

FOREIGN PATENT DOCUMENTS

| | | |
|---|---|---|
| JP | 8-504293 | 5/1996 |
| JP | 11-97011 | 4/1999 |
| JP | 2003-255487 | 9/2003 |
| JP | 2003-257491 | 9/2003 |
| JP | 2005-85638 | 3/2005 |
| JP | 2007-188753 | 7/2007 |
| JP | 2007-519183 | 7/2007 |
| KR | 10-2006-0001625 | 1/2006 |
| KR | 10-2006-0100689 | 9/2006 |
| KR | 10-2006-0108792 | 10/2006 |
| KR | 10-2007-0080483 | 8/2007 |
| KR | 10-2008-0008754 | 1/2008 |
| KR | 10-0829554 | 5/2008 |
| KR | 10-2008-0055510 | 6/2008 |

(Continued)

OTHER PUBLICATIONS

Stephen J. Krause et al., "Morphology and mechanical properties of a phase separated and a molecular composite 30% PBT/70% ABPBI triblock copolymer", *Polymer*, 1988, vol. 29, pp. 195-206.

Yi-Che Su et al., "Synthesis and characterization of fluorinated polybenzoxazine material with low dielectric constant", *Polymer* 44 (2003) pp. 7989-7996.

Juan Antonio Asensio et al., "Polymer Electrolyte Fuel Cells Based on Phosphoric Acid-Impregnated Poly (2, 5-benzimidazole) Membranes", *Journal of the Electrochemical Society*, 151 (2004), pp. A304-A310.

(Continued)

*Primary Examiner* — Rabon Sergent
(74) *Attorney, Agent, or Firm* — Cantor Colburn LLP

(57) ABSTRACT

A hyper-branched polymer, which is a product obtained by performing condensation polymerization reaction of a hyper-branched polymer composition including a diisocyanate-based compound and a dihydroxyamine-based compound, a cross-linked hyper-branched polymer, an electrode and electrolyte membrane for a fuel cell including the hyper-branched polymer or the cross-linked hyper-branched polymer, and a fuel cell including the electrode and the electrolyte membrane.

25 Claims, 6 Drawing Sheets

(56) References Cited

FOREIGN PATENT DOCUMENTS

| | | |
|---|---|---|
| KR | 10-2009-0027183 | 3/2009 |
| KR | 10-2009-0037117 | 4/2009 |
| KR | 10-2009-0045655 | 5/2009 |
| KR | 10-2010-0069625 | 6/2010 |
| WO | WO 2005/060444 | 7/2005 |
| WO | WO 2005/063852 | 7/2005 |

OTHER PUBLICATIONS

Hyoung-Juhn Kim et al., "Polybenzimidazoles for High Temperature Fuel Cell Applications", *Macromolecular Rapid Commun.* 2004, 25, pp. 1410-1413.

Palanichamy Krishnan et al., "Performance of a poly(2,5-benzimidazole) membrane based high temperature PEM fuel cell in the presence of carbon monoxide", *Journal of Power Sources 159* (2006), pp. 817-823.

Jeong-Hi Kim et al., "Dependence of the performance of a high-temperature polymer electrolyte fuel cell on phosphoric acid-doped polybenzimidazole ionomer content in cathode catalyst layer", *Journal of Power Sources 170* (2007), pp. 275-280.

C. Wannek et al., "Durability of ABPBI-based MEAs for High Temperature PEMFCs at Different Operating Conditions", *Fuel Cells 08*, 2008, No. 2, pp. 87-95.

U.S. Appl. No. 13/020,385, filed Feb. 3, 2011, Seong-woo Choi et al., Samsung Electronics Co., Ltd.

U.S. Appl. No. 13/019,625, filed Feb. 2, 2011, Seong-woo Choi et al., Samsung Electronics Co., Ltd. and SNU R&DB Foundation.

U.S. Appl. No. 13/020,035, filed Feb. 3, 2011, Seong-woo Choi et al., Samsung Electronics Co., Ltd. and SNU R&DB Foundation.

U.S. Appl. No. 13/039,745, filed Mar. 3, 2011, Jung-ock Park et al., Samsung Electronics Co., Ltd. and BASF SE.

HYPER-BRANCHED POLYMER, ELECTRODE AND ELECTROLYTE MEMBRANE INCLUDING THE HYPER-BRANCHED POLYMER, AND FUEL CELL INCLUDING AT LEAST ONE OF THE ELECTRODE AND THE ELECTROLYTE MEMBRANE

CROSS-REFERENCE TO RELATED APPLICATION

This application claims the benefit of Korean Application No. 10-2010-0012023, filed Feb. 9, 2010 in the Korean Intellectual Property Office, the disclosure of which is incorporated herein by reference.

BACKGROUND

1. Field

The present disclosure relates to hyper-branched polymers, electrodes and electrolyte membranes for fuel cells, each of which includes the hyper-branched polymers, and fuel cells including at least one of the electrodes and the electrolyte membranes.

2. Description of the Related Art

Fuel cells that include a polymer electrolyte membrane as an electrolyte operate at relatively low temperatures and may be manufactured in a small size. Thus, such fuel cells are expected to be used as energy sources in electric vehicles and in distributed generation systems. Perfluorocarbon sulfonic acid-based polymer membranes, such as NAFION (registered trademark), are commonly used as polymer electrolyte membranes for fuel cells. However, in order for such polymer electrolyte membranes to efficiently realize proton conductivity, moisture is needed and thus the polymer electrolyte membranes need to be humidified. In addition, in order to enhance cell system efficiencies, polymer electrolyte membranes need to be operated at a high temperature, for example, at least 100° C. However, the moisture in the polymer electrolyte membrane is evaporated and depleted at such a temperature, which reduces the effectiveness thereof.

To address such problems, non-humidified electrolyte membranes, which may operate at temperatures of at least 100° C., without humidification, have been developed. For example, polybenzimidazole doped with a phosphoric acid is disclosed as a material for forming a non-humidified electrolyte membrane.

In low temperature perfluorocarbonsulfonate polymer electrolyte membrane fuel cells, in order to prevent defective gas diffusion in an electrode, in particular, a cathode, which may be caused by water (product water) generated during electric power production in the electrode, hydrophobic electrodes including polytetrafluoroethylene (PTFE) have been used.

In addition, phosphoric acid fuel cells, which operate at temperatures of about 150 to about 200° C., include a liquid phosphoric acid as an electrolyte. However, a large amount of the liquid phosphoric acid is included in electrodes and thus interferes with gas diffusion in the electrodes. Therefore, an electrode catalyst layer in which a polytetrafluoroethylene (PTFE) waterproofing agent is added to an electrode catalyst and which prevents fine pores in the electrodes from being clogged by the phosphoric acid, has been used.

In addition, in fuel cells including a polybenzimidazole (PBI) electrolyte membrane, which uses a phosphoric acid as a high-temperature and non-humidified electrolyte, in order to improve surface contact between electrodes and the electrolyte membrane, a method of impregnating the electrodes with a liquid phosphoric acid and a method of increasing a loading amount of metal catalysts have been used. However, such fuel cells do not produce improved properties.

When air is supplied to a cathode, activation takes about a week even if an electrode composition is optimized in a solid polymer electrolyte membrane doped with a phosphoric acid. Although performance of fuel cells may be improved and activation time may be reduced by replacing air with oxygen, use of oxygen is not proper in terms of commercialization. In addition, a homogeneous polymer electrolyte membrane using the PBI is not satisfactory in terms of mechanical characteristics, chemical stability, or capability of retaining a phosphoric acid at high temperature. Thus, there is a demand for further improvement.

SUMMARY

Provided are hyper-branched polymers having excellent thermal resistance, a hyper-branched polymer composition, a cross-linked hyper-branched polymer prepared using the hyper-branched polymer composition, an electrode and an electrolyte membrane, each of which include the hyper-branched polymer or the cross-linked hyper-branched polymer, and a fuel cell having improved cell voltage characteristics, the fuel cell including at least one of the electrode and the electrolyte membrane.

Additional aspects will be set forth in part in the description which follows and, in part, will be apparent from the description, or may be learned by practice of the present embodiments.

According to an aspect of the present invention, a hyper-branched polymer, which is a product obtained by performing condensation polymerization reaction of a hyper-branched polymer composition includes a diisocyanate-based compound represented by Formula 1 and a dihydroxyamine-based compound represented by Formula 2;

$$N{=}C{=}O{-}A{-}N{=}C{=}O \qquad \text{[Formula 1]}$$

wherein, in Formula 1, A is a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, a substituted or unsubstituted $C_6$-$C_{30}$ arylene group, a substituted or unsubstituted $C_2$-$C_{30}$ heteroarylene group, a substituted or unsubstituted $C_4$-$C_{30}$ carbon ring group, or a substituted or unsubstituted $C_6$-$C_{30}$ condensed polycyclic group.

$$HO{-}Ar_1{-}NH{-}Ar_2{-}OH \qquad \text{[Formula 2]}$$

wherein, in Formula 2, $Ar_1$ and $Ar_2$ are each independently a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, a substituted or unsubstituted $C_6$-$C_{30}$ arylene group, a substituted or unsubstituted $C_2$-$C_{30}$ heteroarylene group, a substituted or unsubstituted $C_4$-$C_{30}$ carbon ring group, or a substituted or unsubstituted $C_6$-$C_{30}$ condensed polycyclic ring group.

According to another aspect of the present invention, a hyper-branched polymer composition includes the hyper-branched polymer above and a benzoxazine-based monomer.

According to another aspect of the present invention, a cross-linked hyper-branched polymer, which is a product of cross-linking reaction of the hyper-branched polymer composition is provided.

According to another aspect of the present invention, an electrode for a fuel cell includes the hyper-branched polymer or the cross-linked hyper-branched polymer.

According to another aspect of the present invention, an electrolyte membrane for a fuel cell includes the hyper-branched polymer or the cross-linked hyper-branched polymer.

According to another aspect of the present invention, a fuel cell includes a cathode; an anode; and an electrolyte membrane disposed between the cathode and the anode, wherein at least one of the cathode, the anode, and the electrolyte membrane includes the hyper-branched polymer.

Additional aspects and/or advantages of the invention will be set forth in part in the description which follows and, in part, may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
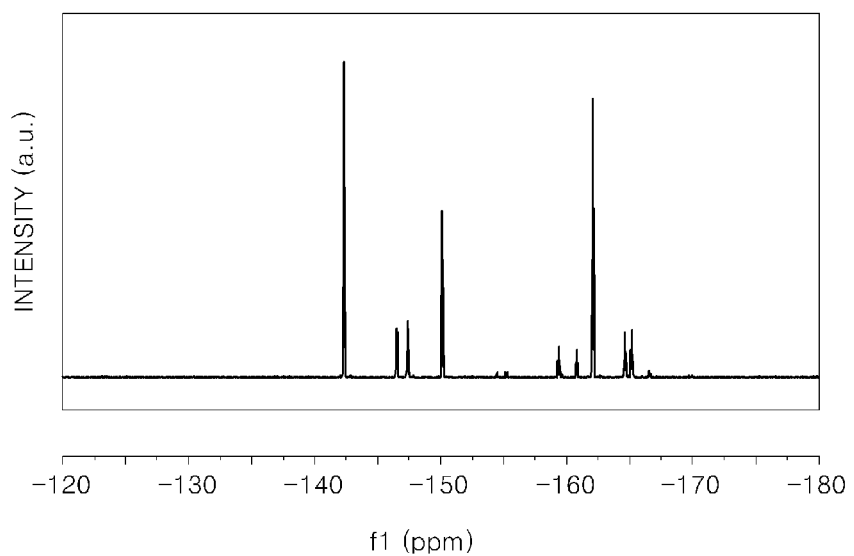
FIG. 1 is a graph showing $^{19}$F-nuclear magnetic resonance ($^{19}$F-NMR) analysis spectrum of the compound of Formula 10 prepared according to Synthesis Example 2.

Reference will now be made in detail to certain embodiments of the present invention, examples of which are illustrated in the accompanying drawings, wherein like reference numerals refer to the like elements throughout. The embodiments are described below in order to explain a few examples of the present invention by referring to the figures.

A hyper-branched polymer, which is a product obtained by performing a condensation polymerization reaction of a hyper-branched polymer composition including a diisocyanate-based compound represented by Formula 1 and a dihydroxyamine-based compound represented by Formula 2, is provided.

N=C=O-A-N=C=O                     [Formula 1]

wherein, in Formula 1, A is a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, a substituted or unsubstituted $C_6$-$C_{30}$ arylene group, a substituted or unsubstituted $C_2$-$C_{30}$ heteroarylene group, a substituted or unsubstituted $C_4$-$C_{30}$ carbon ring group, or a substituted or unsubstituted $C_6$-$C_{30}$ condensed polycyclic group.

HO—$Ar_1$—NH—$Ar_2$—OH           [Formula 2]

wherein, in Formula 2, $Ar_1$ and $Ar_2$ are each independently a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, a substituted or unsubstituted $C_6$-$C_{30}$ arylene group, a substituted or unsubstituted $C_2$-$C_{30}$ heteroarylene group, a substituted or unsubstituted $C_4$-$C_{30}$ carbon ring group, or a substituted or unsubstituted $C_6$-$C_{30}$ condensed polycyclic ring group.

The amount of the dihydroxyamine-based compound in a range of about 1 to about 1.1 mol is based on 1 mol of the diisocyanate-based compound represented by Formula 1.

When the amount of the dihydroxyamine-based compound is within the above range, a yield of the hyper-branched polymer is excellent.

The product obtained by performing condensation polymerization reaction of the hyper-branched polymer composition includes a urethane bond or a urea bond.

The diisocyanate-based compound is an aliphatic diisocyanate-based compound or an aromatic diisocyanate-based compound as in Formula 1. Here, the aromatic diisocyanate-based compound includes a heteroaromatic diisocyanate-based compound.

Examples of the aliphatic diisocyanate-based compound may include hexamethylene diisocyanate (HMDI), isophorone diisocyanate (IPDI), and compounds represented by the Formulae below.

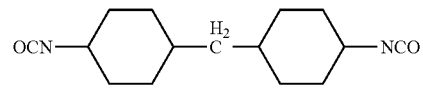

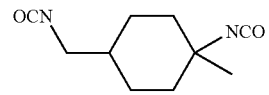

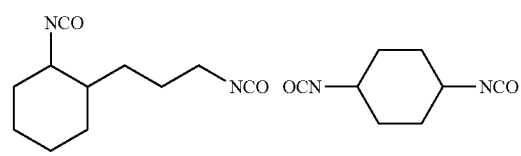

Examples of the aromatic diisocyanate-based compound may include a compound represented by Formula 3 below or compounds represented by the Formulae below.

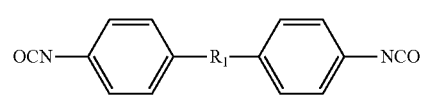

[Formula 3]

wherein, in Formula 3, $R_1$ represents a single bond or —$(CH_2)_a$—, —$(CF_2)_a$—, —$(CCl_2)_a$—, —$C(CH_3)_2$—, —$C(CF_3)_2$—, (a is a positive number in a range of 1 to 5), —C(=O), or —S(=O)$_2$—.

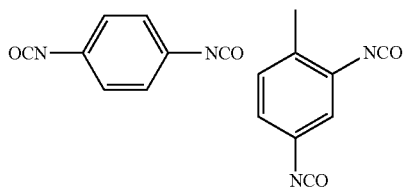
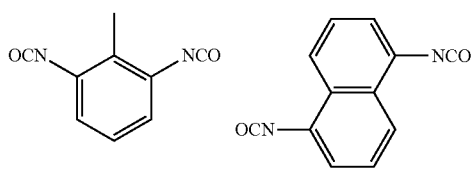
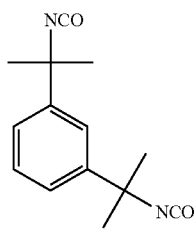

According to an embodiment, the compound represented by Formula 3 is bis(4-isocyanatophenyl)methane (MDI).

The compound represented by Formula 2 below may be a compound represented by Formula 4 or compounds represented by the Formulae below.

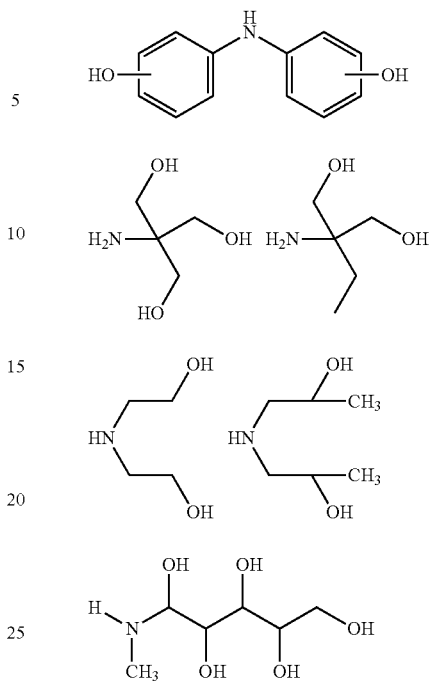

Examples of the compound represented by Formula 4 may include 3,3'-dihydroxydiphenylamine.

Examples of the hyper-branched polymer may include a core unit represented by Formula 5 below, a dendritic unit represented by Formula 6 below, a linear unit represented by Formula 7 below, and a terminal unit represented by Formula 8 below.

[Formula 5]

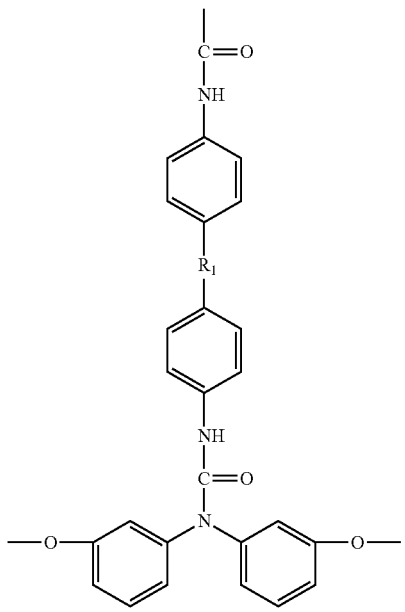

-continued

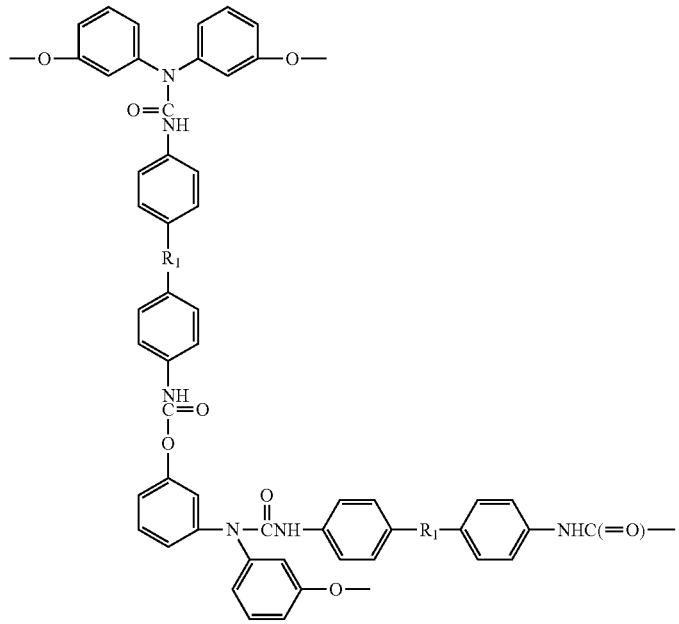

[Formula 6]

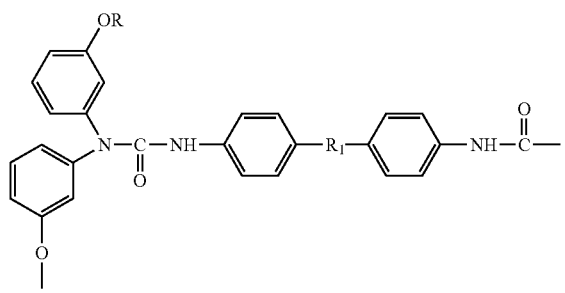

[Formula 7]

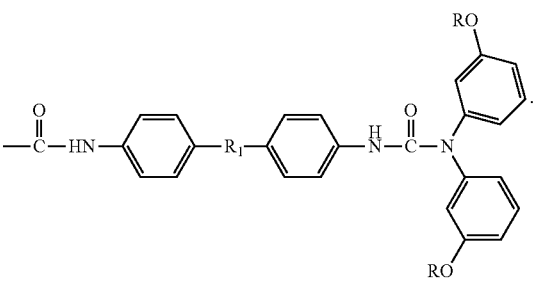

[Formula 8]

wherein, in Formulae 5 through 8, $R_1$ represents a single bond, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, a substituted or unsubstituted $C_6$-$C_{30}$ arylene group, a substituted or unsubstituted $C_2$-$C_{30}$ heteroarylene group, substituted or unsubstituted $C_4$-$C_{30}$ carbon ring group, or a substituted or unsubstituted $C_6$-$C_{30}$ condensed polycyclic ring group, R is hydrogen or —C(=O)NH—$R_2$, and $R_2$ represents hydrogen, a substituted or unsubstituted $C_1$-$C_{30}$ alkyl group, a substituted or unsubstituted $C_1$-$C_{30}$ alkoxy group, a substituted or unsubstituted $C_6$-$C_{30}$ aryl group, a substituted or unsubstituted $C_3$-$C_{30}$ carbon ring group, a substituted or unsubstituted $C_2$-$C_{30}$ hetero aryl group, a substituted or unsubstituted $C_2$-$C_{30}$ heterocyclic group, a $C_6$-$C_{30}$ condensed polycyclic group, a halogen atom, a cyano group, a hydroxy group or a carboxyl group.

wherein, in Formulae 5 through 8, $R_1$ is —(CH$_2$)$_a$—, —(CF$_2$)$_a$—, —(CCl$_2$)$_a$—, —C(CH$_3$)$_2$—, —C(CF$_3$)$_2$—, (a is a positive number in a range of 1 through 5), —C(=O), or —S(=O)$_2$—.

A degree of branching of the hyper-branched polymer is greater or equal to 0.5 and less than or equal to 1.

The degree of branching represents a ratio of a total number of the dendritic units and terminal units, to a total number of the dendritic units, linear units, and terminal units. For example, if the degree of branching is 0, it means that only the linear units are included. If the degree of branching is 1, it means that no linear units and no terminal units are included.

The degree of branching may be calculated based on a ratio of integral values for the peaks of the dendritic units, linear units, and terminal units in a nuclear magnetic resonance (NMR) spectrum.

The hyper-branched polymer may be synthesized from a monomer in the form of AB$_2$ and may have three types of repeating units, as described above, i.e., the dendritic units, linear units, and terminal units.

The number-average molecular weight of the hyper-branched polymer may be in a range of about 6,000 to about 1,000,000.

The hyper-branched polymer may be one of the compounds represented by Formulae 9 through 10 below.

[Formula 9]
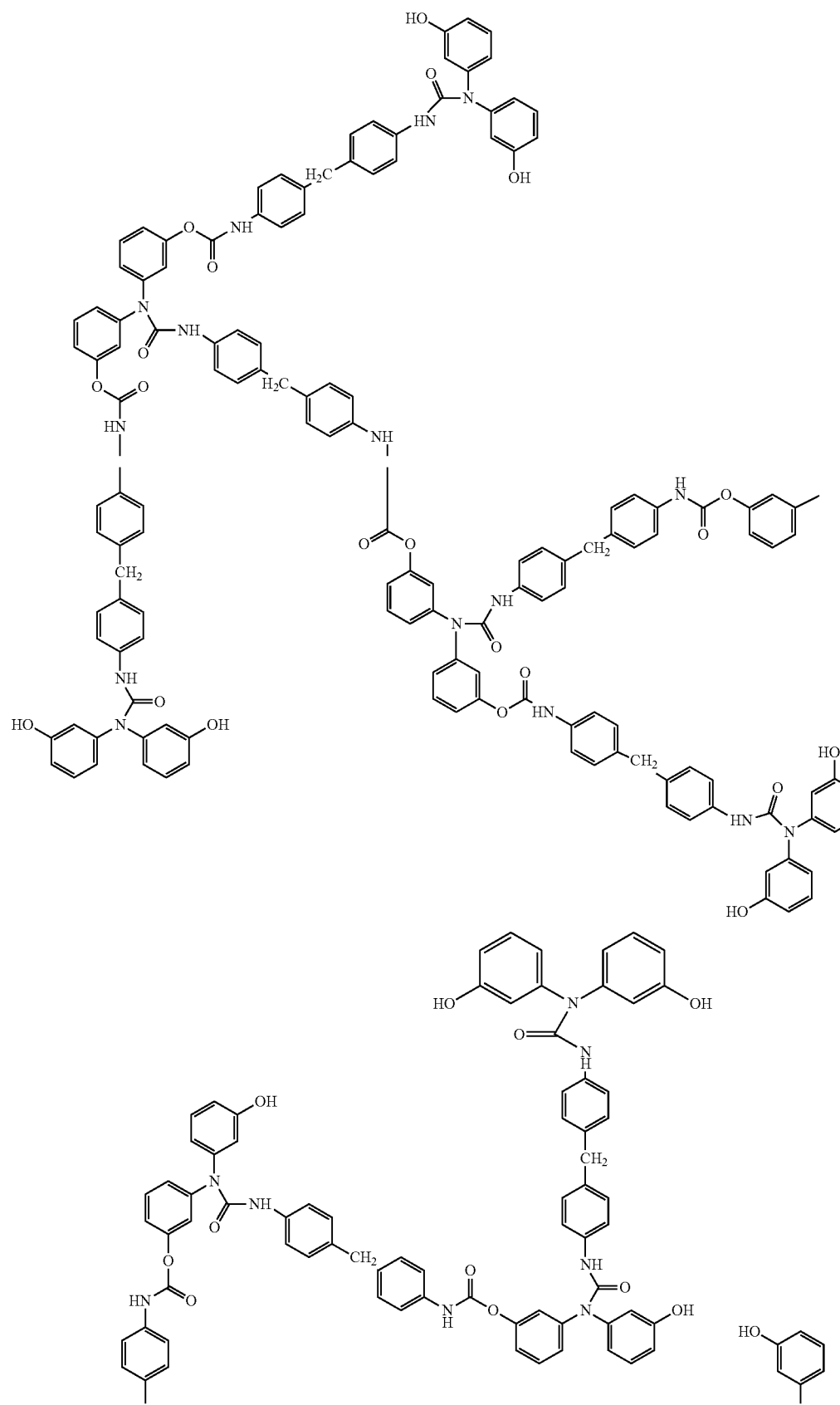

11 12
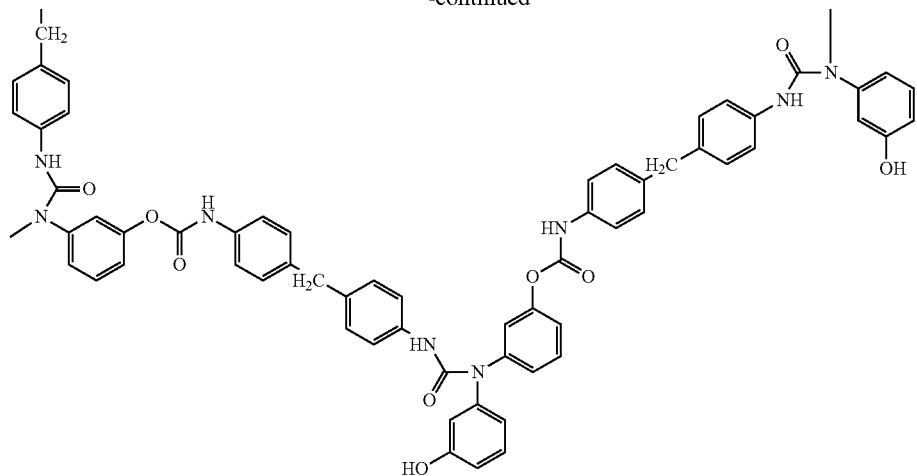
[Formula 10]
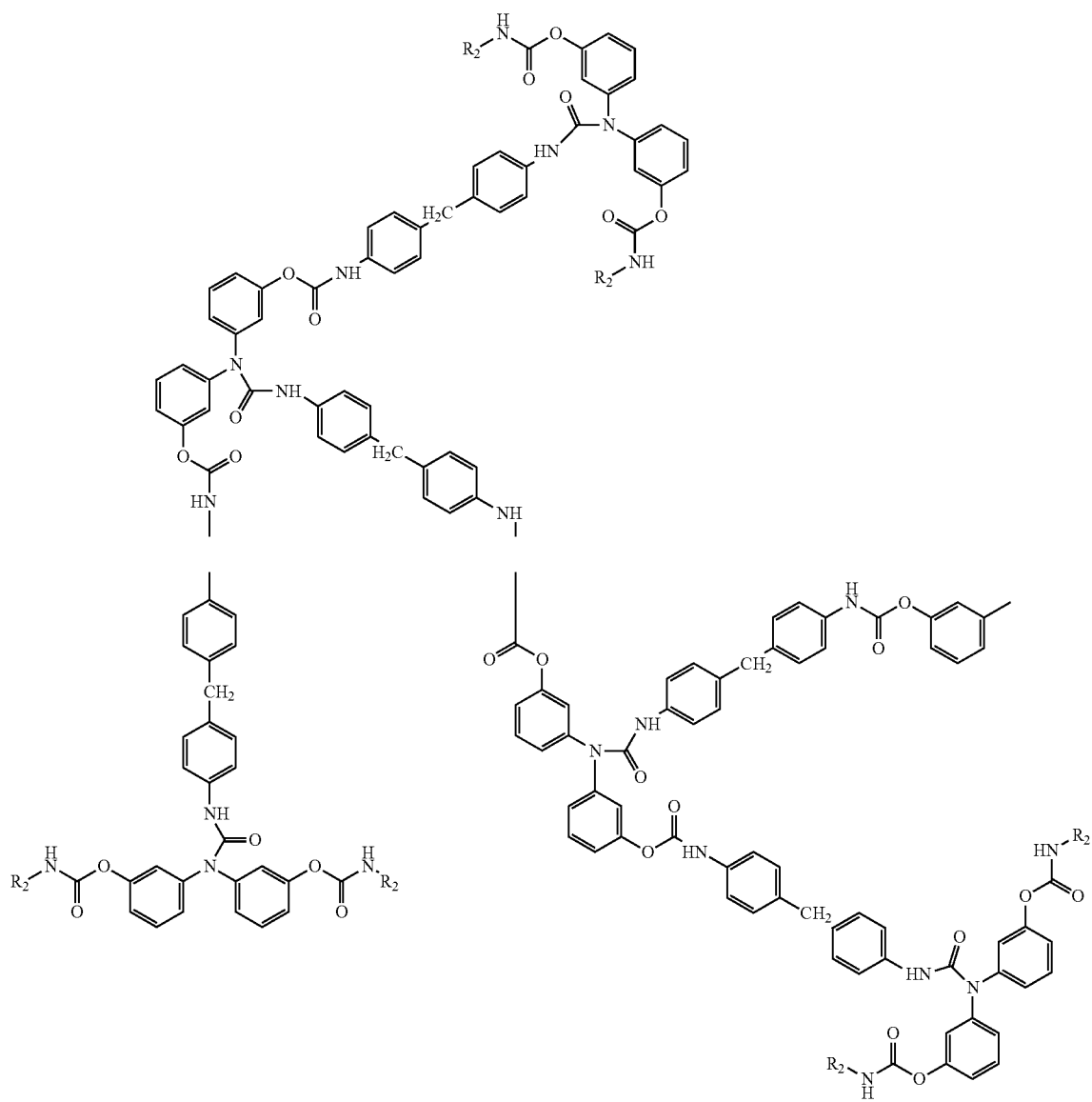

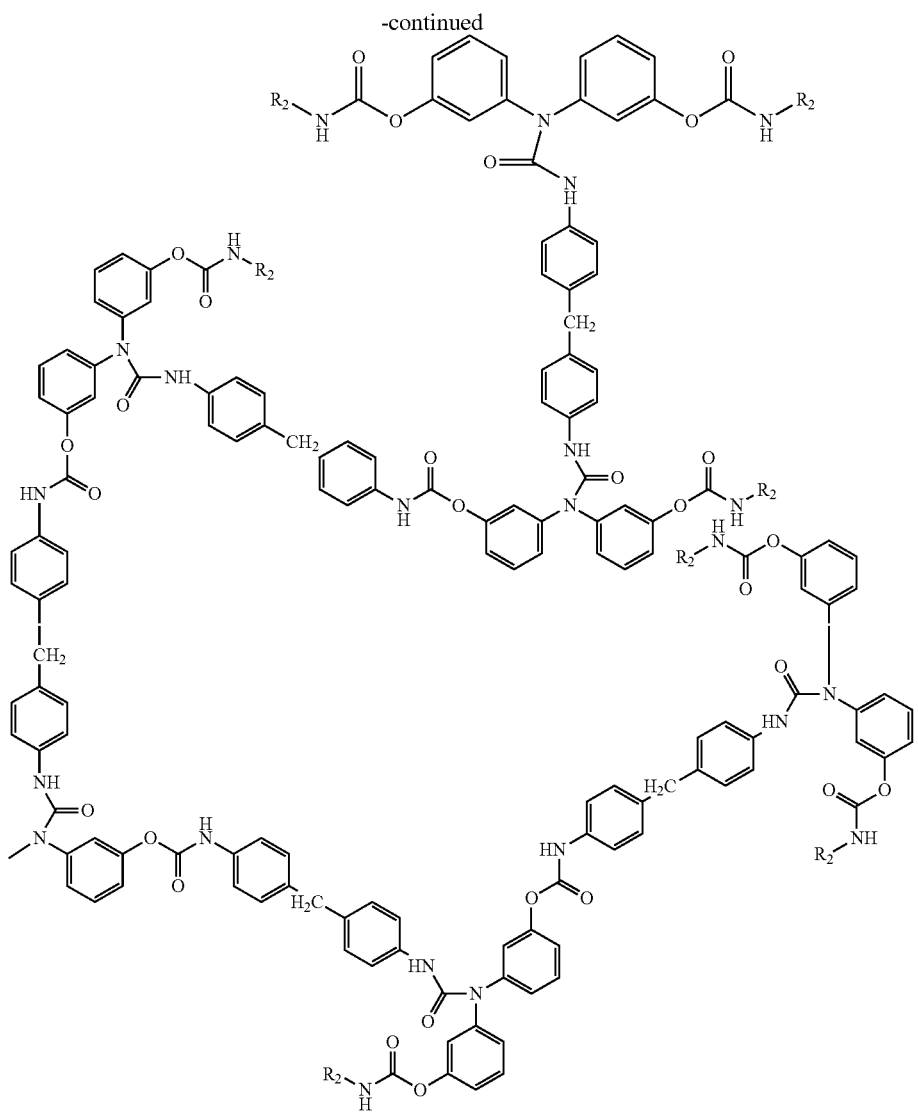

wherein, in Formula 10, $R_2$ is selected from the groups represented by the following Formulae.

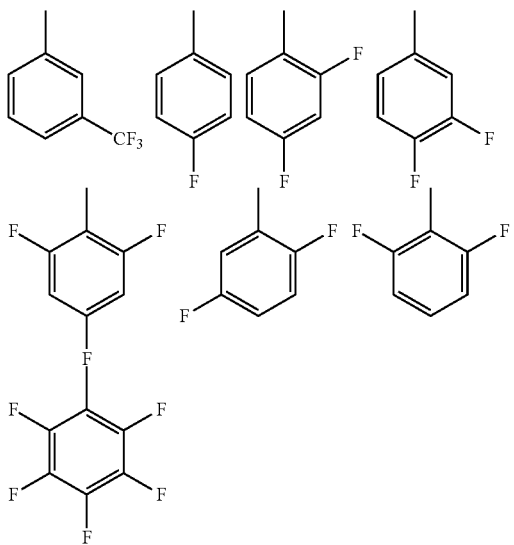

wherein, in Formula 10, $R_2$ is hydrogen or pentafluorophenyl.

The compounds represented by Formulae 9 and 10 may have the degree of branching of about 0.05 to about 0.9, for example, about 0.63 to about 0.9, and may have the number-average molecular weight of about 6,000 to about 1,000,000.

Hereinafter, a method of manufacturing the hyperbranched polymer is described. As an example, a method of preparing the compounds represented by Formulae 9 and 10 will be described.

The diisocyanate-based compound represented by Formula 1 is dissolved in a first solvent to prepare a first solution. Then, a second solution prepared by dissolving the dihydroxyamine-based compound represented by Formula 2 in a second solvent is added to the first solution. Here, a condensation polymerization reaction is performed for the second solution at a temperature in a range of about −10 to about 25° C., thereby forming a corresponding urea.

When the reaction temperature is within the above range, a yield of the condensation polymerization reaction may be excellent.

Then, a catalyst is added to the reaction solution and then is thermally treated at a temperature in a range of about 80 to about 130° C. Then, a polymerization reaction is performed and thereby, the hyper-branched polymer represented by Formula 9 including the urethane bond and the urea bond may be obtained.

The hyper-branched polymer represented by Formula 10 may be obtained by mixing the hyper-branched polymer represented by Formula 9 with an isocyanate-based compound $R_2N=C(=O)$ and performing a urethane formation reaction for the mixture at about 70 to about 100° C.

In the isocyanate-based compound $R_2N=C(=O)$, $R_2$ is hydrogen, a substituted or unsubstituted $C_1$-$C_{30}$ alkyl group, a substituted or unsubstituted $C_1$-$C_{30}$ alkoxy group, a substituted or unsubstituted $C_6$-$C_{30}$ aryl group, a substituted or unsubstituted $C_3$-$C_{30}$ carbon ring group, a substituted or unsubstituted $C_2$-$C_{30}$ hetero aryl group, a substituted or unsubstituted $C_2$-$C_{30}$ heterocyclic group, a substituted or unsubstituted $C_3$-$C_{30}$ condensed polycyclic ring group, a halogen atom, a cyano group, a hydroxy group, or a carboxyl group. Examples of $R_2$ may include pentafluorophenyl.

When the reaction temperature is within the above range, a yield of the urethane formation reaction is excellent.

Examples of the isocyanate-based compound may include bis(4-isocyanatophenyl)methane and 2,4-toluene diisocyanate, pentafluorophenyl isocyanate.

The catalyst may be dibutyl tin laurate or 4-diazolebicyclo [2,2,2]-octane. The amount of the catalyst may be in a range of about $10^{-5}$ to about $10^{-2}$ mol, for example, about $10^{-4}$ to about $10^{-2}$ mol, based on 1 mol of the diisocyanate-based compound.

When the amount of the catalyst is within the above range, reactivity of the diisocyanate-based compound represented by Formula 1 and the dihydroxyamine-based compound represented by Formula 2 is excellent.

The first solvent and the second solvent may be dimethylacetamide or dimethylformamide. The amount of the first solvent may be in a range of about 80 to about 120 parts by weight based on 100 parts by weight of the diisocyanate-based compound.

The amount of the second solvent may be in a range of about 80 to about 120 parts by weight based on 100 parts by weight of the dihydroxyamine-based compound.

The degrees of branching and the number-average molecular weights of the hyper-branched polymers may vary according to the type of reaction solvent, reaction time, and reaction temperature.

The hyper-branched polymer, which is a single macromolecule, may be easy to synthesize and may be mass produced. Also, the hyper-branched polymer includes fluorine or a fluorine functional group and thus has improved oxygen affinity. Accordingly, oxygen permeability thereof is improved and thus the hyper-branched polymer has improved heat resistance, durability, and phosphoric acid retention characteristics.

According to another embodiment of the present invention, there is provided a hyper-branched polymer composition including the hyper-branched polymer and a benzoxazine-based monomer is provided.

The composition may further include a cross-linking compound.

According to another embodiment of the present invention, there is provided a cross-linked hyper-branched polymer as a product of cross-linking reaction of the hyper-branched polymer composition.

Examples of the cross-linking compound may include at least one selected from the group consisting of polybenzimidazoles (FBI), polybenzthiazoles, polybenzoxazoles, and polyimides.

Examples of polybenzimidazoles (PBI) may include compounds represented by the' following formulae.

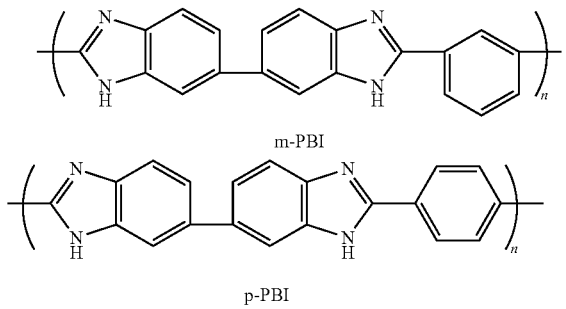

m-PBI p-PBI wherein n is an integer of 10 or greater, for example, an integer of 100 or greater. The number-average molecular weight of the polymer is 1,000,000 or less.

The amount of the cross-linking compound may be in a range of about 5 to about 95 parts by weight based on 100 parts by weight of the benzoxazine-based monomer.

The amount of the hyper-branched polymer may be in a range of about 0.1 to about 10 parts by weight based on 100 parts by weight of the benzoxazine-based monomer.

When the amounts of the cross-linking compound and the hyper-branched polymer are within the above ranges, the final cross-linked hyper-branched polymer may have excellent phosphoric acid retention capability.

The cross-linked hyper-branched polymer may be prepared by thermally treating a hyper-branched polymer composition including the hyper-branched polymer and the benzoxazine-based monomer or a hyper-branched polymer composition including the hyper-branched polymer, the benzoxazine-based monomer, and the cross-linking compound at a temperature of about 50 to about 250° C., for example, about 80 to about 220° C.

When the hyper-branched polymer composition including the hyper-branched polymer and the benzoxazine-based monomer as a starting material is thermally treated, the benzoxane-based monomer is polymerized and thus a polymer of the benzoxane-based monomer is formed. Accordingly, the polymer of the benzoxane-based monomer and/or the benzoxane-based monomer, and the hyper-branched polymers are subjected to cross-linking reaction to obtain a cross-linked hyper-branched polymer.

When the hyper-branched polymer composition including the hyper-branched polymer, the benzoxazine-based monomer, and the cross-linking compound as a starting material is used and the heat treatment is performed, the benzoxazine-based monomer is polymerized and thus a polymer of the benzoxazine-based monomer is formed. Accordingly, the polymer of the benzoxane-based monomer and/or the benzoxazine-based monomer are subjected to a cross-linking reaction with the cross-linking compound and the hyper-branched polymers, thereby forming the product of the cross-linking reaction.

During this process, a graft polymer of the benzoxazine-based monomer, the hyper-branched polymer, and the cross-linking compound may be obtained.

The thermal treatment process may not be performed if required. For example, when an electrode and/or an electrolyte membrane are manufactured using a mixture of the hyper-branched polymer and the benzoxazine-based monomer or a mixture of the hyper-branched polymer, the benzoxazine-based monomer and the cross-linking compound, the mixture of the hyper-branched polymer and the benzoxazine-based monomer or the mixture of the hyper-branched polymer, the benzoxazine-based monomer and the cross-linking compound may be cross-linked when the battery operates.

The benzoxazine-based monomer may include, but is not limited to, at least one selected from the group consisting of the compounds represented by Formulae 11 through 16 below.

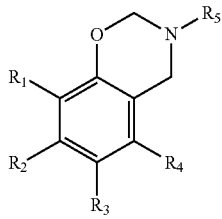

[Formula 11]

wherein, in Formula 11, $R_1$ through $R_4$ are each independently hydrogen, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_2$-$C_{20}$ heteroaryl group, a substituted or unsubstituted $C_2$-$C_{20}$ heteroaryloxy group, a substituted or unsubstituted $C_4$-$C_{20}$ carbon ring group, a substituted or unsubstituted $C_4$-$C_{20}$ carbon ring oxy group, a substituted or unsubstituted $C_2$-$C_{20}$ heterocyclic group, a halogen atom, a hydroxy group, or a cyano group; and $R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbon ring group, a substituted or unsubstituted $C_4$-$C_{20}$ carbon ring alkyl group, a substituted or unsubstituted $C_2$-$C_{20}$ heterocyclic group, or a substituted or unsubstituted $C_2$-$C_{20}$ hetero ring alkyl group,

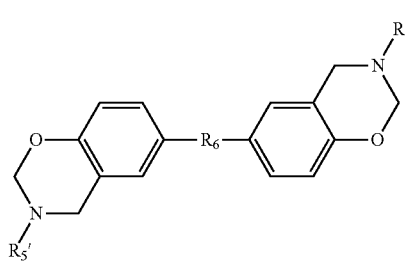

[Formula 12]

wherein, in Formula 12, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbon ring group, a substituted or unsubstituted $C_4$-$C_{20}$ carbon ring alkyl group, a substituted or unsubstituted $C_2$-$C_{20}$ heterocyclic group, or a substituted or unsubstituted $C_2$-$C_{20}$ hetero ring alkyl group; and $R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_2$-$C_{20}$ heteroarylene group, —C(═O)—, and —SO$_2$—,

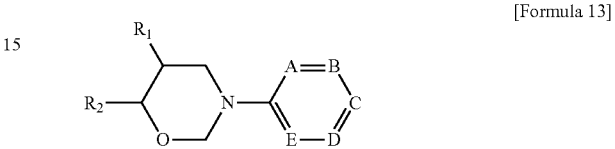

[Formula 13]

wherein, in Formula 13, A, B, C, D and E are all carbon; or one or two of A, B, C, D and E are nitrogen (N) and the others are carbon (C), and $R_1$ and $R_2$ are linked to form a ring, wherein the ring is a $C_6$-$C_{10}$ carbon ring group, a $C_3$-$C_{10}$ heteroaryl group, a fused $C_3$-$C_{10}$ heteroaryl group, a $C_3$-$C_{10}$ heterocyclic group or a fused $C_3$-$C_{10}$ heterocyclic group,

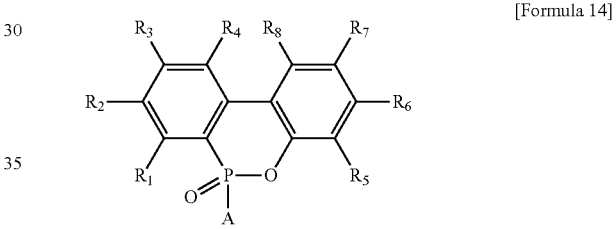

[Formula 14]

wherein, in Formula 14, A is a substituted or unsubstituted $C_1$-$C_{20}$ heterocyclic group, a substituted or unsubstituted $C_4$-$C_{20}$ cycloalkyl group, or a substituted or unsubstituted $C_1$-$C_{20}$ alkyl group; and $R_1$ through $R_8$ are each independently hydrogen, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_1$-$C_{20}$ heteroaryl group, a $C_1$-$C_{20}$ heteroaryloxy group, a $C_4$-$C_{20}$ cycloalkyl group, a $C_1$-$C_{20}$ heterocyclic group, a halogen atom, a cyano group, or a hydroxy group,

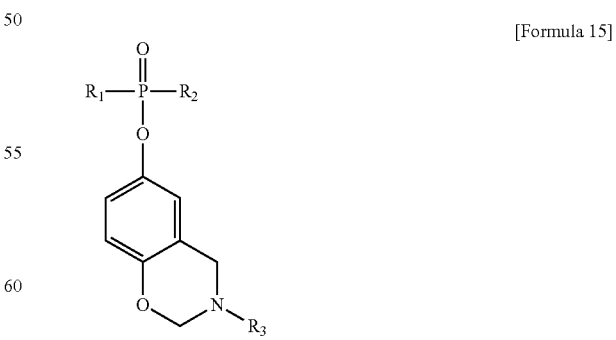

[Formula 15]

wherein, in Formula 15, $R_1$ and $R_2$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 15A below,

[Formula 15A]

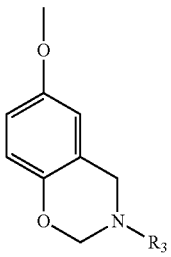

wherein, in Formulae 15 and 15A, $R_3$ is each independently hydrogen, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group, or a halogenated $C_1$-$C_{20}$ heterocyclic group,

[Formula 16]

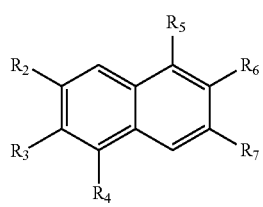

wherein, in Formula 16, at least two adjacent groups selected from among $R_2$, $R_3$ and $R_4$ are linked to form a group represented by Formula 16A below, and the non-selected remaining group is hydrogen, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group, at least two adjacent groups selected from among $R_5$, $R_6$ and $R_7$ are linked to form the group represented by Formula 16A below, and the non-selected remaining group is a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group or a halogenated $C_1$-$C_{20}$ heterocyclic group.

[Formula 16A]

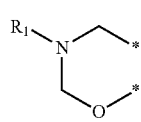

wherein, in Formula 16A, $R_1$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_2$-$C_{20}$ heteroaryl group, a substituted or unsubstituted $C_2$-$C_{20}$ heteroaryloxy group, a substituted or unsubstituted $C_2$-$C_{20}$ heteroarylalkyl group, a substituted or unsubstituted $C_4$-$C_{20}$ carbon ring group, a substituted or unsubstituted $C_4$-$C_{20}$ carbon ring alkyl group, a substituted or unsubstituted $C_2$-$C_{20}$ heterocyclic group, or a substituted or unsubstituted $C_2$-$C_{20}$ heterocyclic alkyl group, and

* denotes the sites at which the at least two adjacent groups selected from among $R_2$, $R_3$, and $R_4$ of Formula 16 and the at least two adjacent groups selected from among $R_5$, $R_6$ and $R_7$ are linked, respectively.

In Formula 16A, $R_1$ is selected from the groups represented by the following formulae.

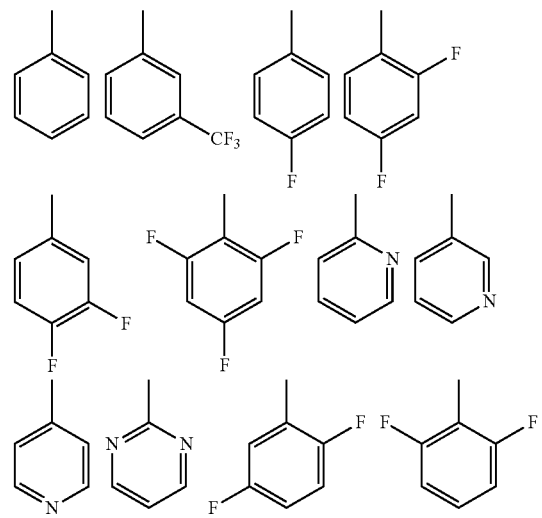

Examples of the benzoxazine-based monomer represented by Formula 11 may include compounds represented by the following formulae.

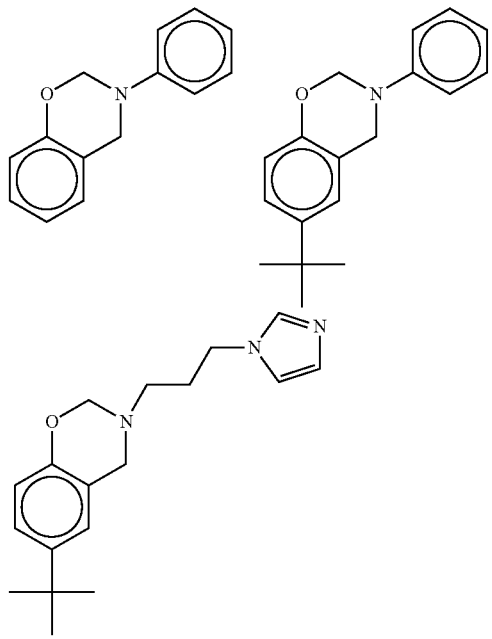

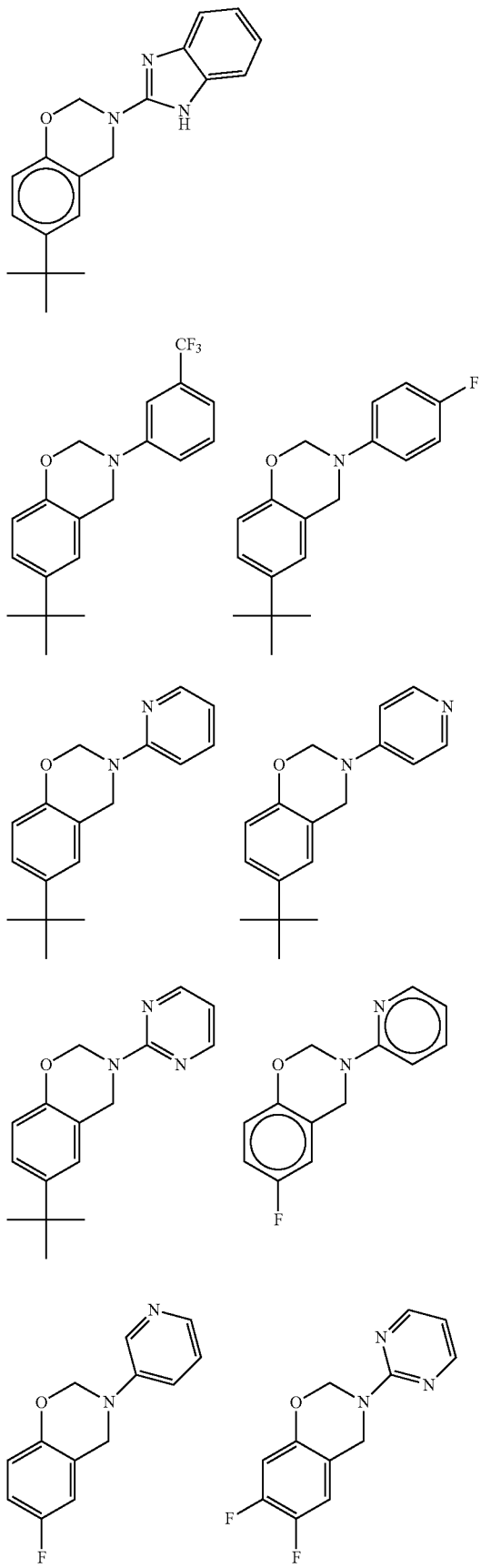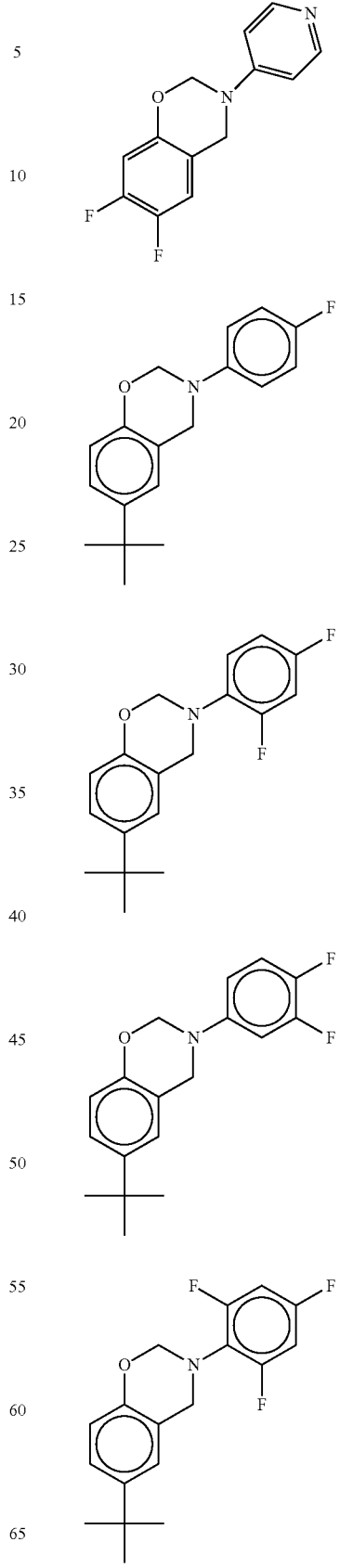

-continued
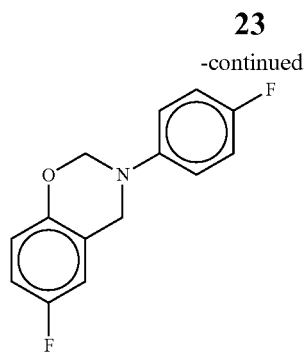
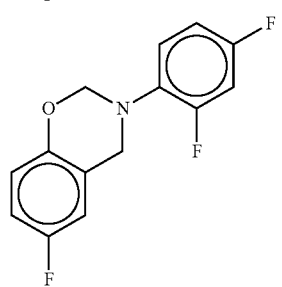
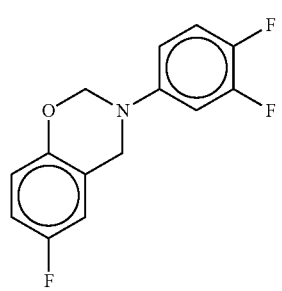
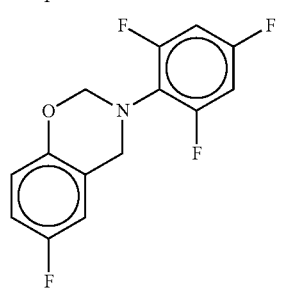
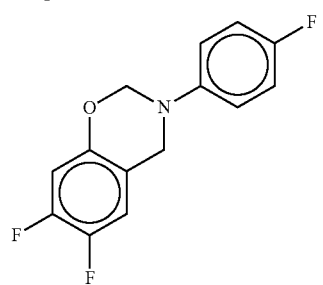
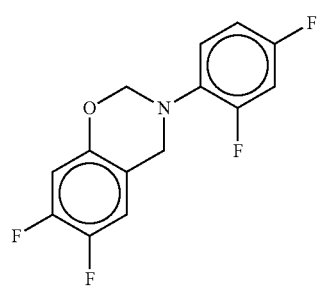
-continued
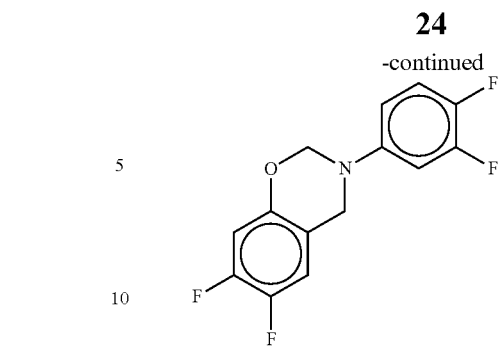
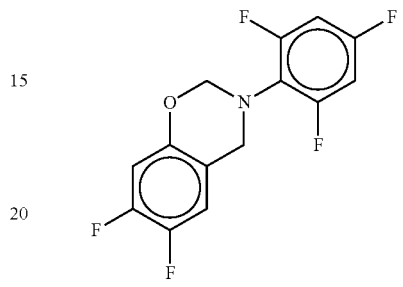
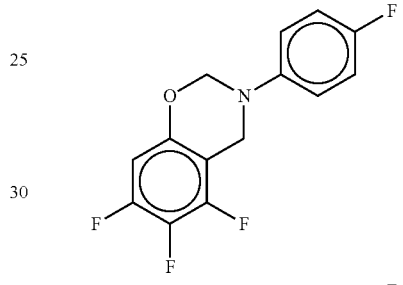
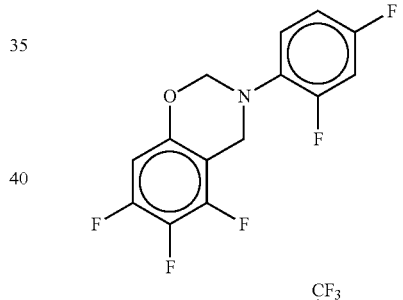
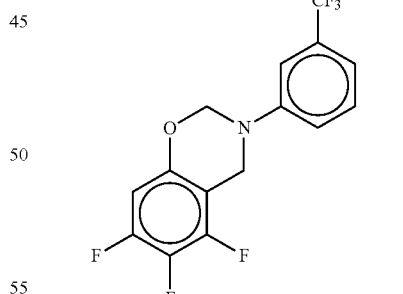
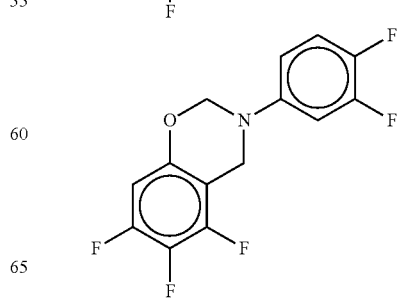

25
-continued
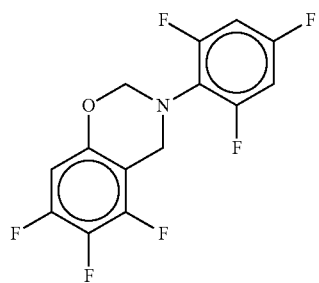
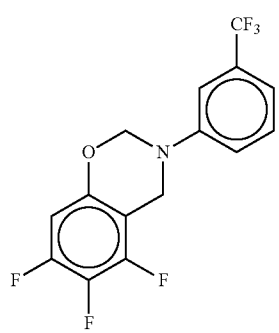
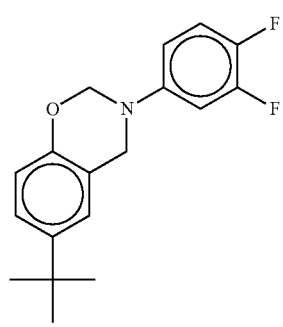
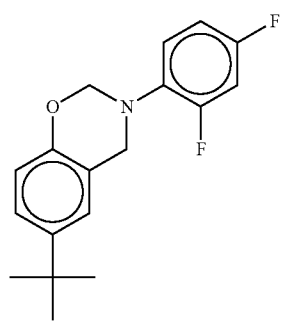
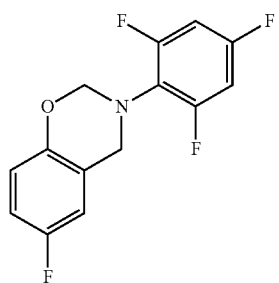
26
-continued
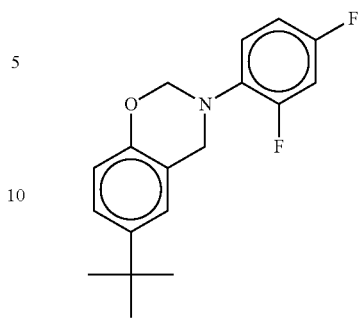
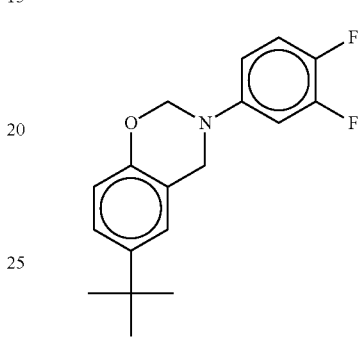
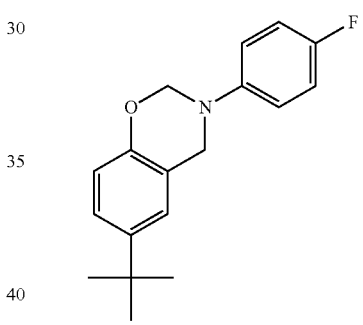
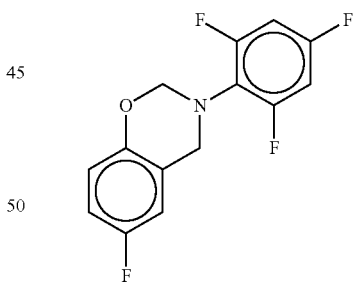
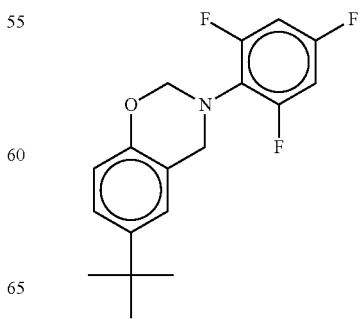

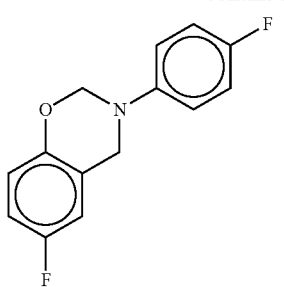
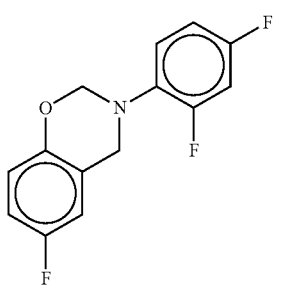
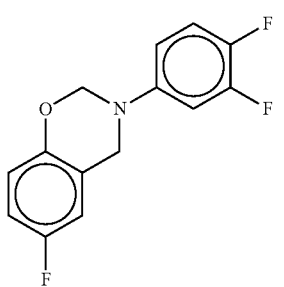
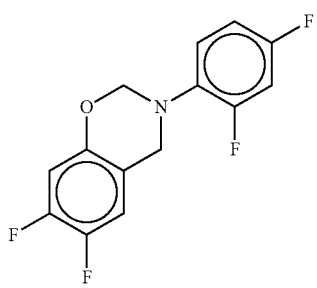
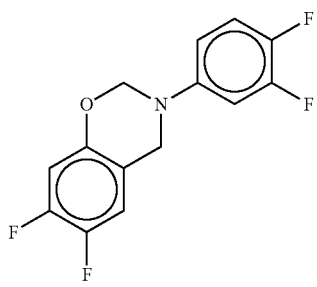
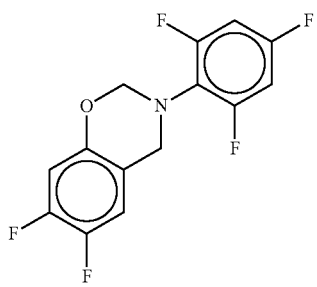
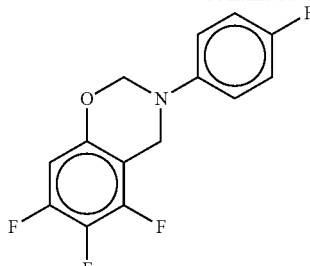
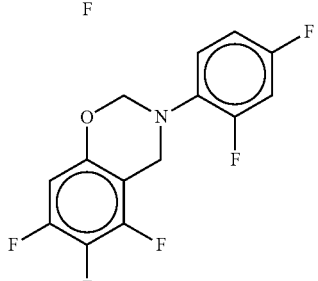
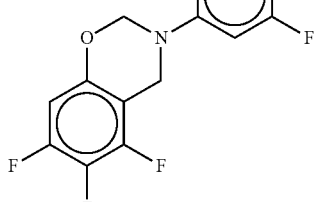
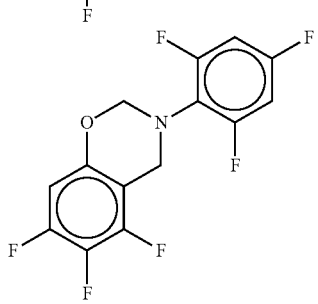
Examples of the benzoxazine-based monomer represented by Formula 12 may include compounds represented by the following formulae.
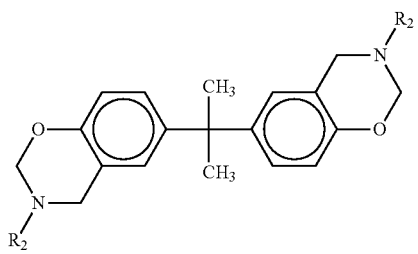
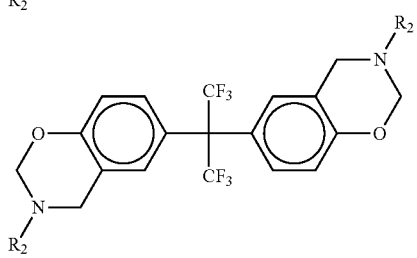

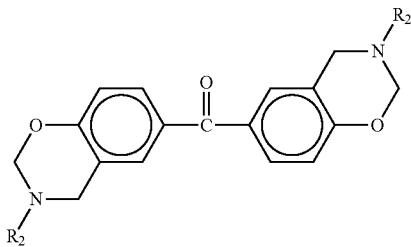
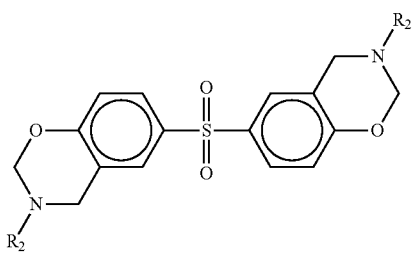
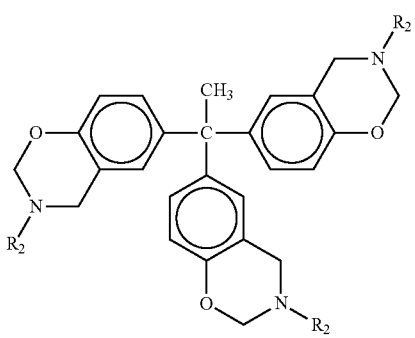
In the formulae above, R$_2$ is a phenyl group, —CH$_2$—CH=CH$_2$, or one of the groups represented by the following formulae:
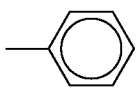 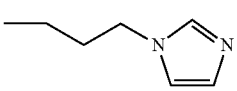
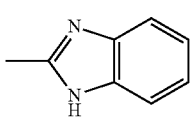 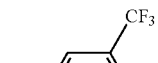
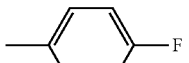 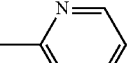
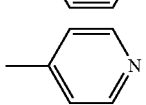 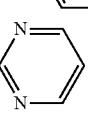
For example, the compound represented by Formula 12 may be selected from the compounds represented by the following formulae:
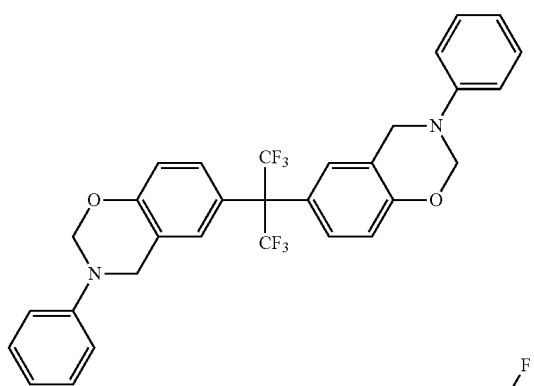
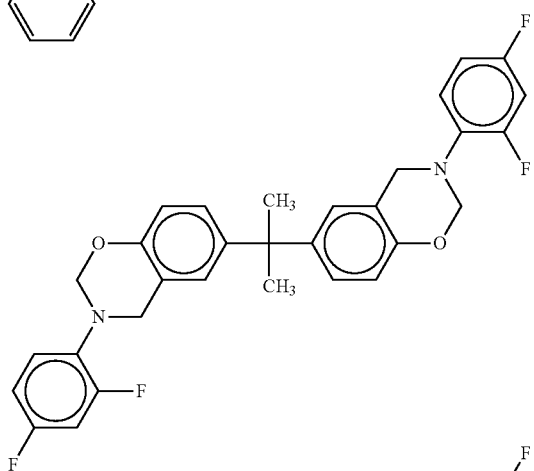
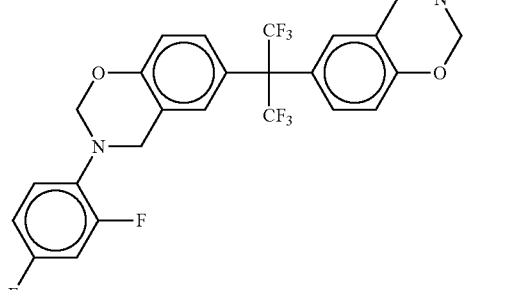
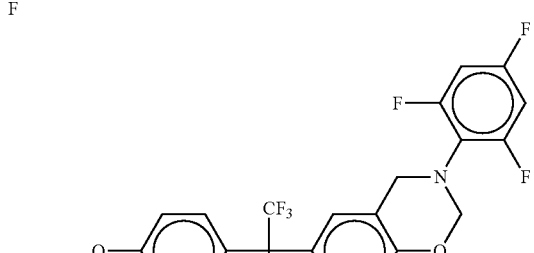
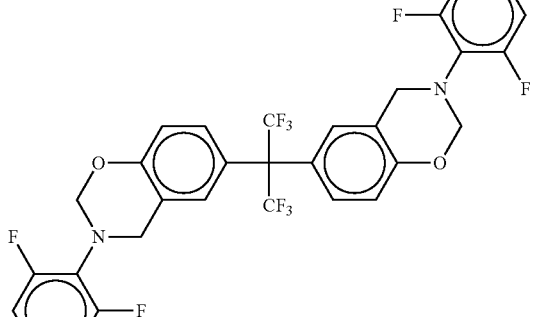

Examples of the benzoxazine-based monomer represented by Formula 13 may include compounds represented by the following formulae.

[Formula 13A]

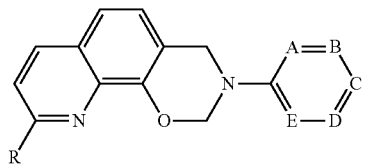

In Formula 13A, R is hydrogen or a $C_1$-$C_{10}$ alkyl group.

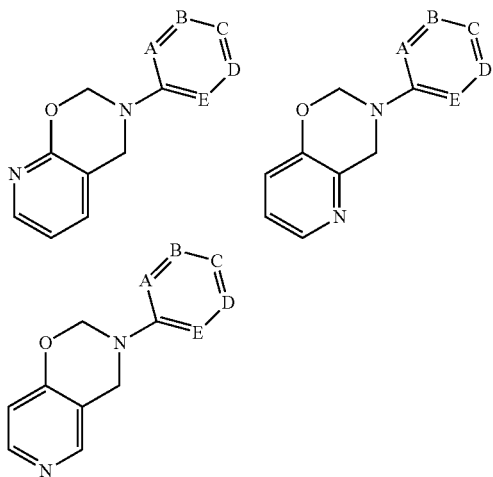

In Formula 13 above,

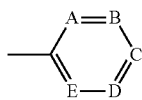

is selected from the groups represented by the following formulae.

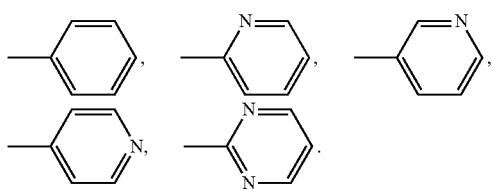

Examples of the benzoxazine-based monomer represented by Formula 13 may include compounds represented by the following formulae.

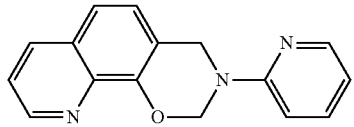

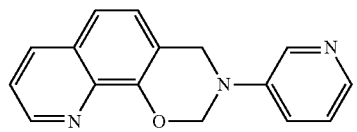

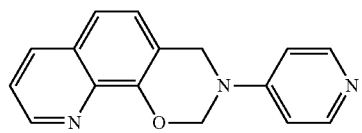

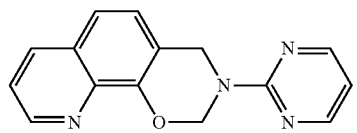

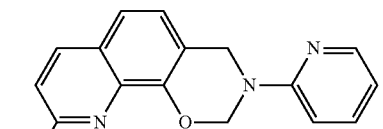

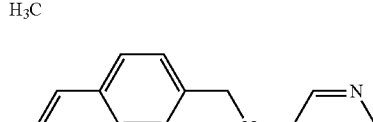

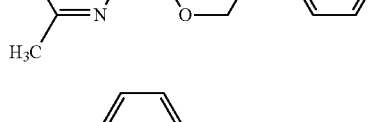

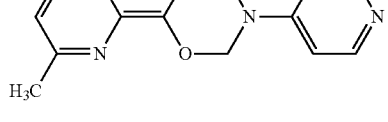

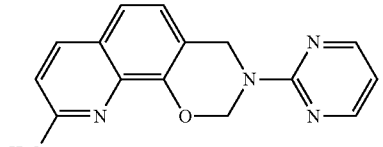

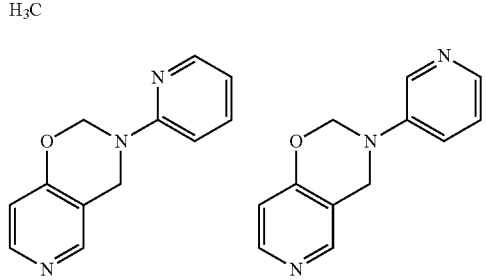

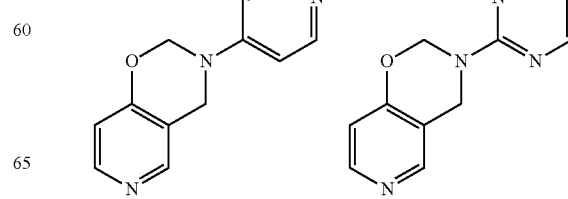

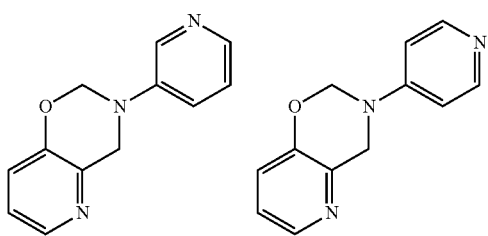
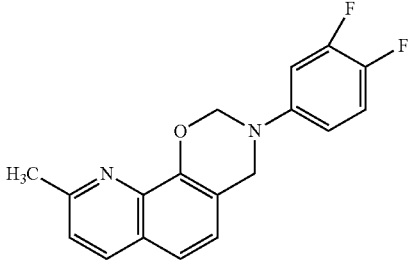

Examples of the benzoxazine-based monomer represented by Formula 14 may include compounds represented by the following formulae.

In Formula.14, A may be selected from the groups represented by Formulae 14A and 14B below.

[Formula 14A]

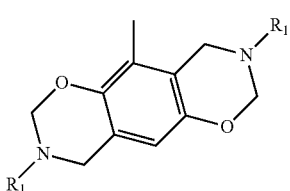

[Formula 14B]

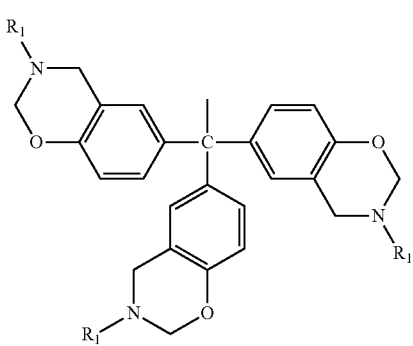

In Formulae 14A and 14B, $R_1$ is hydrogen, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_1$-$C_{20}$ heteroaryl group, a $C_1$-$C_{20}$ heteroaryloxy group, a halogenated $C_1$-$C_{20}$ heteroaryl group, a halogenated $C_1$-$C_{20}$ heteroaryloxy group, a $C_4$-$C_{20}$ carbon ring group, a halogenated $C_4$-$C_{20}$ carbon ring group, a $C_1$-$C_{20}$ heterocyclic group, or a halogenated $C_1$-$C_{20}$ heterocyclic group.

Examples of the benzoxazine-based monomer of Formula 14 containing phosphorous may include compounds represented by Formula 14C below.

[Formula 14C]

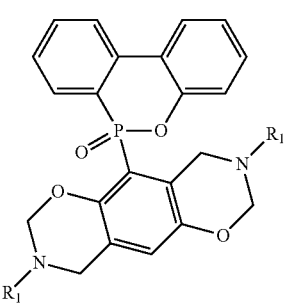

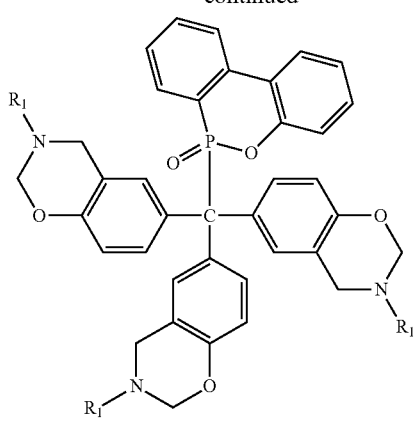
In Formula 14C, R₁ may be selected from the groups represented by the following formulae.
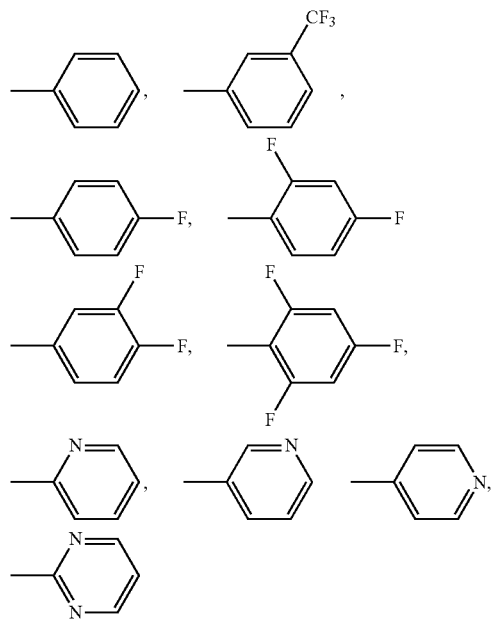
The compound represented by Formula 14 above is selected from the compounds represented by the following formulae:
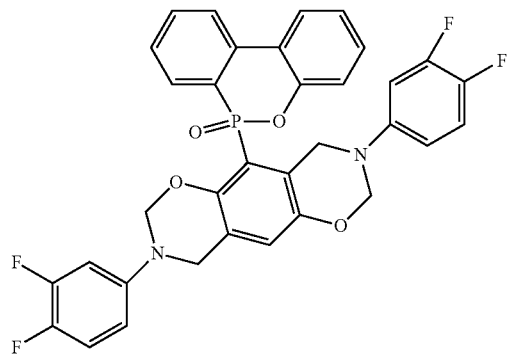
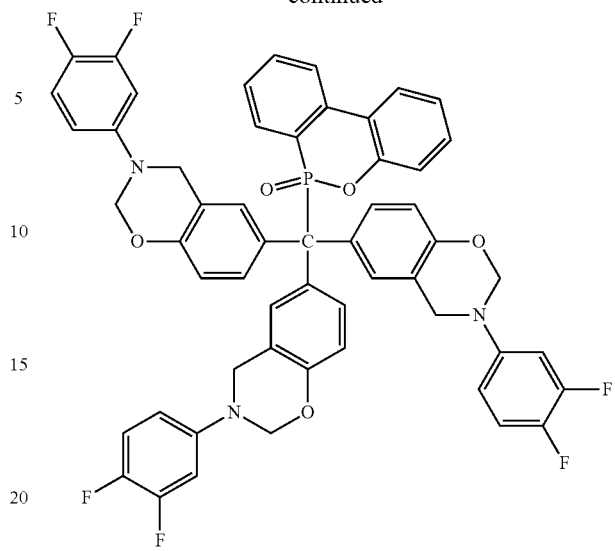
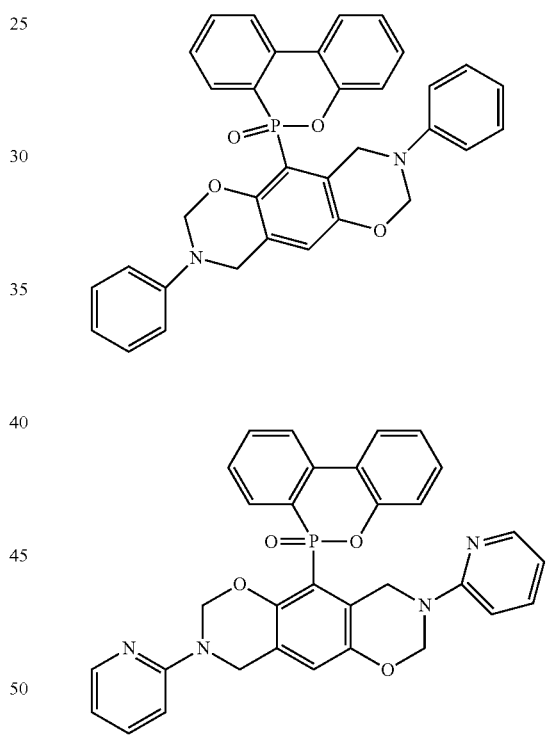
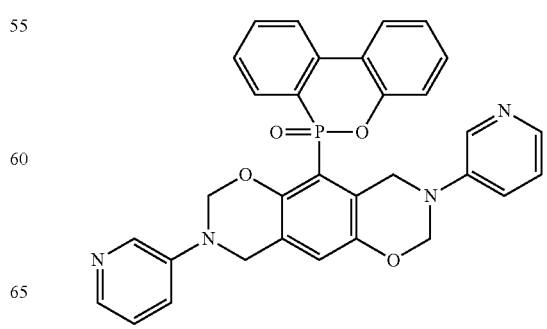

-continued

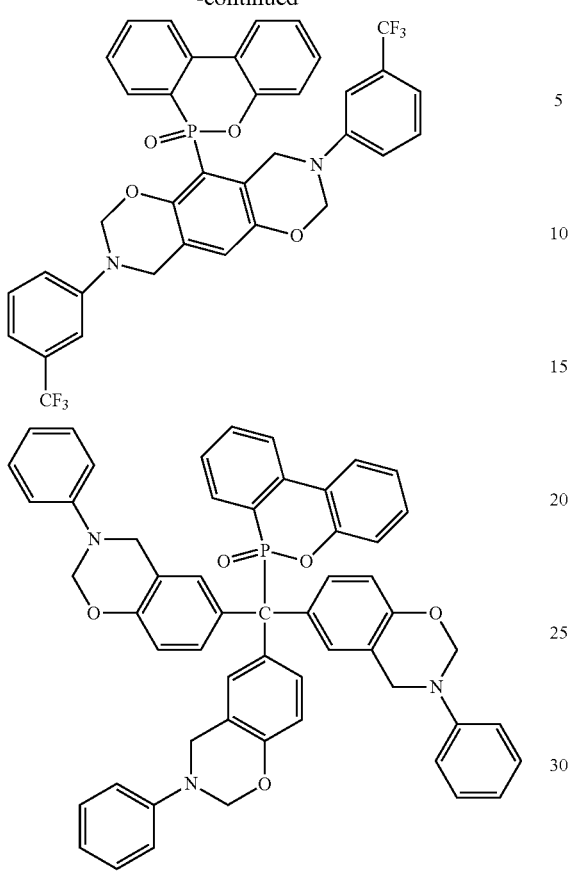

Examples of the benzoxazine-based monomer represented by Formula 15 may include compounds represented by Formulae 15B, 15C and 15D below.

[Formula 15B]

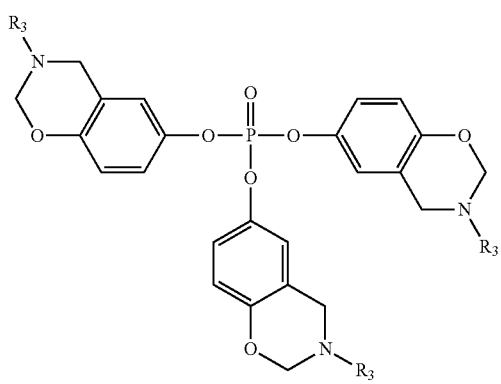

[Formula 15C]

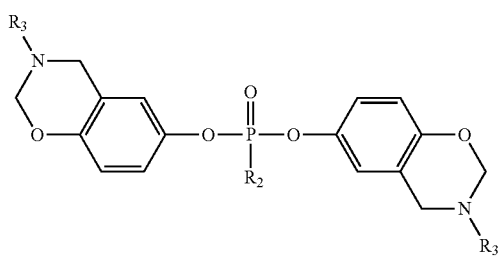

In Formulae 15B and 15C, $R_2$ is a $C_1$-$C_{10}$ alkyl group, a $C_1$-$C_{10}$ alkoxy group, a $C_6$-$C_{10}$ aryl group, or a $C_6$-$C_{10}$ aryloxy group; and $R_3$ is selected from the groups represented by the following formulae:

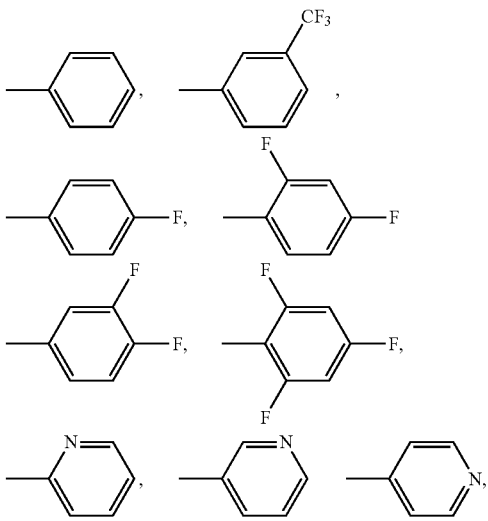

[Formula 15D]

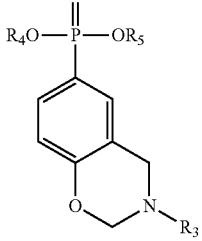

In Formula 15D, R and $R_5$ are each independently a $C_6$-$C_{10}$ aryl group; and $R_3$ is selected from the groups represented by the following formulae:

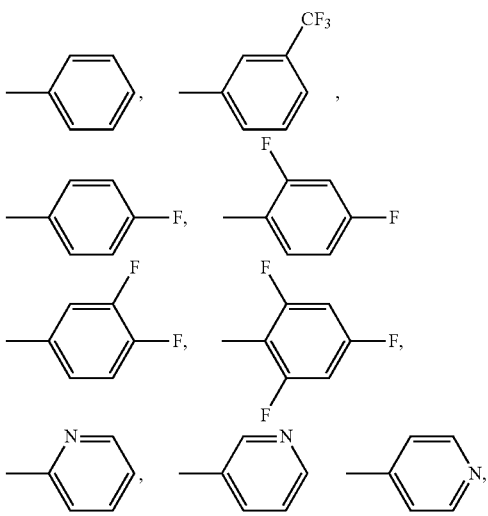

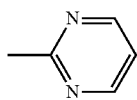
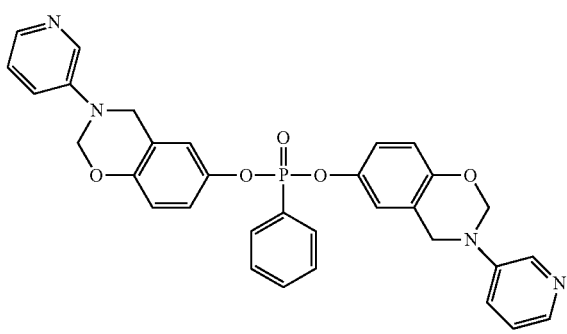
The compounds represented by Formula 15 may be selected from the compounds represented by Formulae 15E and 15F below:
[Formula 15E]
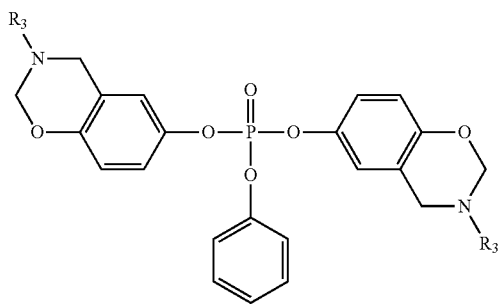
[Formula 15F]
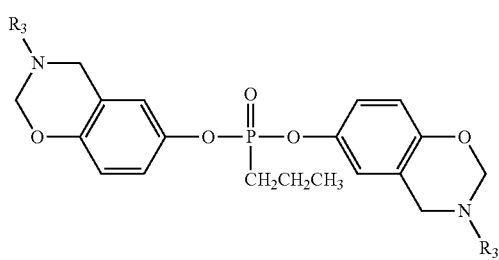
In Formulae 15E and 15F, $R_3$ is selected from the groups represented by the following formulae.
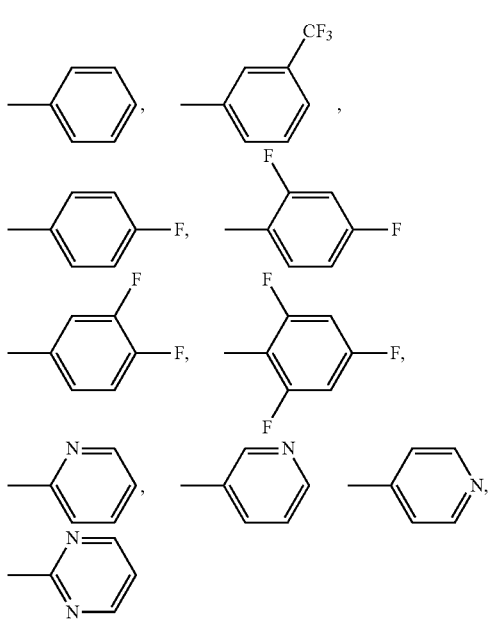
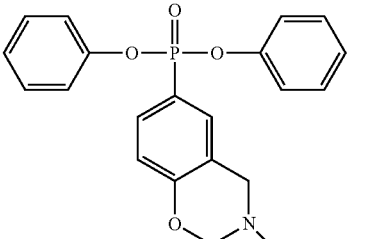
Examples of the benzoxazine-based monomer represented by Formula 15 may include compounds represented by the following formulae.
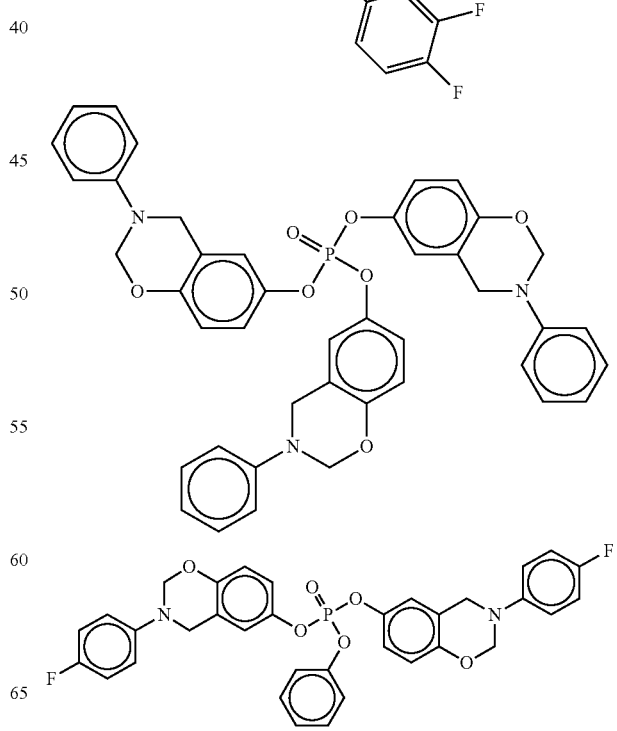

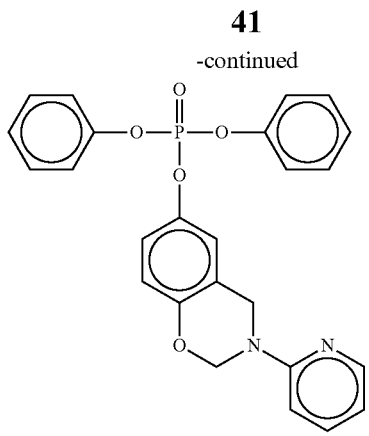
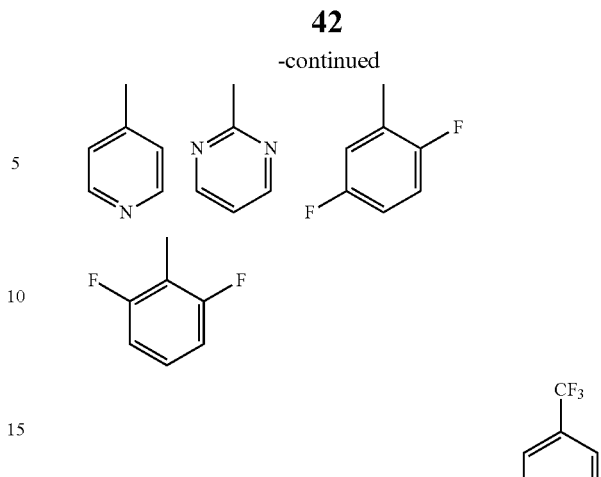
Examples of the benzoxazine-based monomer represented by Formula 16 may include compounds represented by Formulae 16A through 16C.
[Formula 16A]
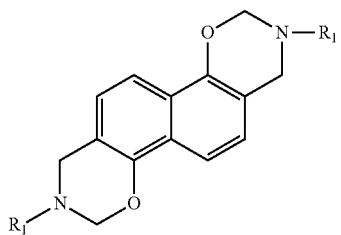
[Formula 16B]
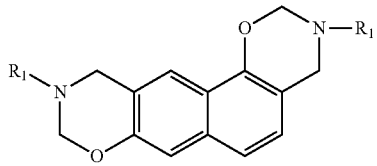
[Formula 16C]
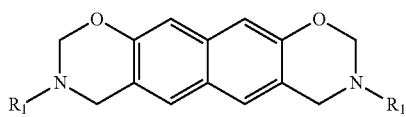
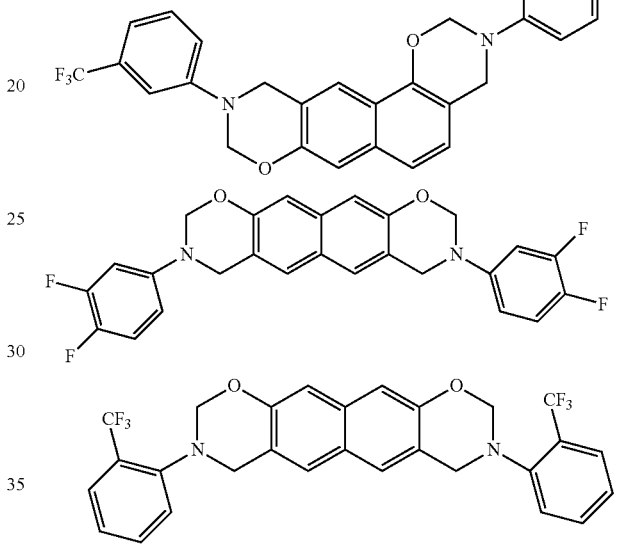
In Formulae 16A through 16C, $R_1$ is selected from the groups represented by the following formulae.
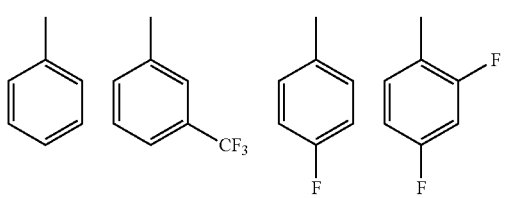
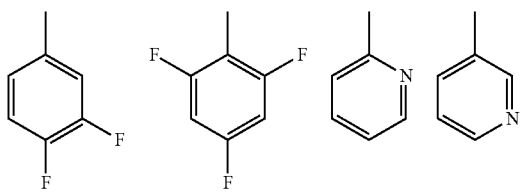
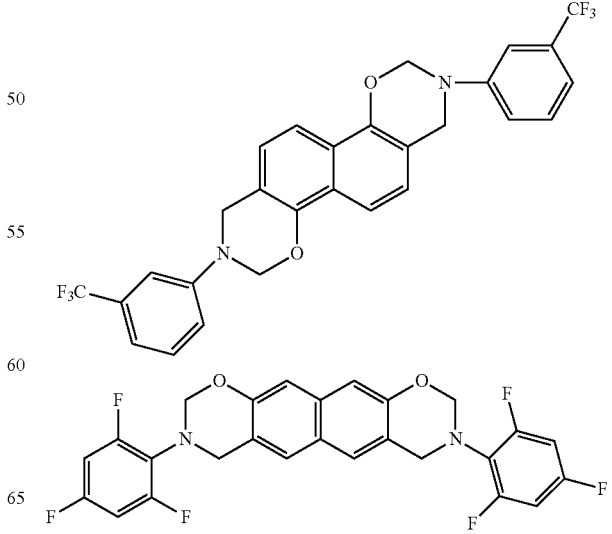

-continued

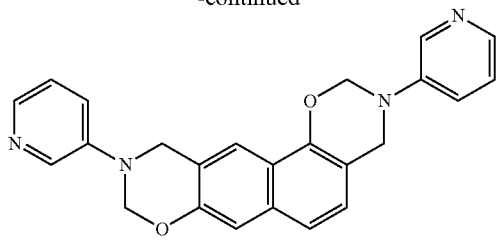

According to another embodiment of the present invention, there is provided an electrode for a fuel cell including the hyper-branched polymer or the cross-linked hyper-branched polymer.

According to another embodiment of the present invention, there is provided an electrode for a fuel cell including the hyper-branched polymer composition.

The electrode includes one selected from group consisting of the hyper-branched polymer and the cross-linked hyper-branched polymer, and a catalyst layer including a catalyst. A core unit of the hyper-branched polymer may be represented by Formula 4.

Figure 5:
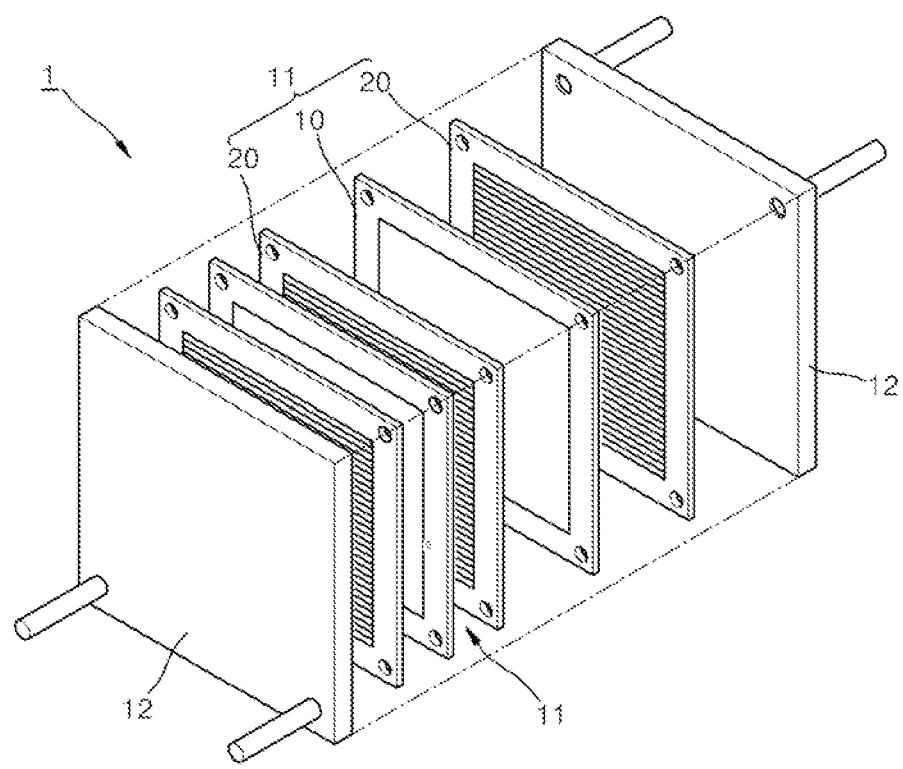
FIG. 5 is a perspective exploded view of a fuel cell according to an embodiment of the present invention.
Figure 6:
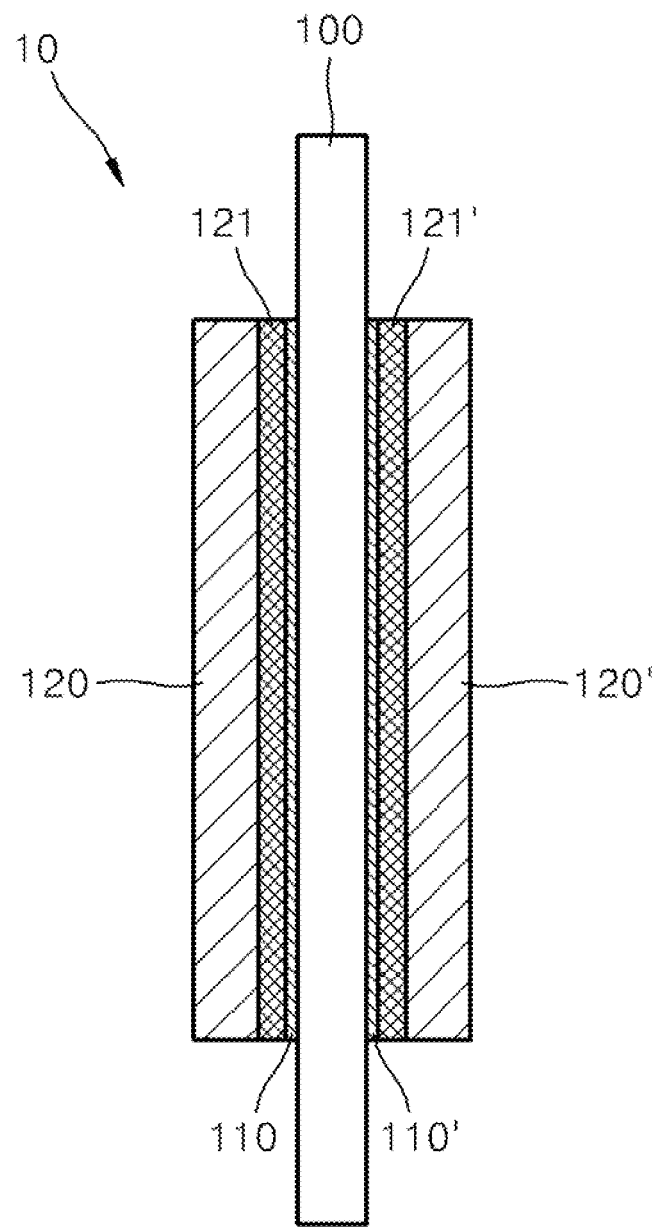
FIG. 6 is a cross-sectional view of a MEA included in the fuel cell of FIG. 5, according to an embodiment of the present invention.

By way of example, FIG. 5 is a perspective exploded view of a fuel cell 1 according to an embodiment of the present invention, and FIG. 6 is a cross-sectional view of a MEA 10 included in the fuel cell 1 of FIG. 5, according to an embodiment of the present invention. Referring to FIG. 5, the fuel cell 1 includes two unit cells 11 interposed between a pair of holders 12. Each unit cell 11 includes an MEA 10, and a pair of bipolar plates 20 respectively disposed on both sides of the MEA 10. The bipolar plates 20 include a conductive metal, carbon or the like, and function as current collectors, while providing oxygen and fuel to the catalytic layers of the MEAs 10.

Although only two unit cells 11 are shown in FIG. 5, the number of unit cells is not limited to two and a fuel cell may have several tens or hundreds of unit cells, depending on the required properties of the fuel cell.

Referring to FIG. 6, each MEA 10 includes an electrolyte membrane 100, catalytic layers 110 and 110' respectively disposed on either side of the electrolyte membrane 100 in the thickness direction thereof, first gas diffusion layers 121 and 121' respectively stacked on the catalytic layers 110 and 110', and second gas diffusion layers 120 and 120' respectively stacked on the first gas diffusion layers 121 and 121'.

The catalytic layers 110 and 110' function as a fuel electrode and an oxygen electrode each including a catalyst and a binder, and may further include a material that can increase the electrochemical surface area of the catalyst. According to an aspect of the invention, at least one of the electrodes and/or the electrolyte membrane 100 comprises the cross-linked hyper-branched polymer.

The first gas diffusion layers 121 and 121' and the second gas diffusion layers 120 and 120' may each be formed of a material such as, for example, carbon sheet or carbon paper. The first gas diffusion layers 121 and 121' and the second gas diffusion layers 120 and 120' diffuse oxygen and fuel supplied through the bipolar plates 20 to the entire surface of the catalytic layers 110 and 110'.

The fuel cell 1 including the MEAs 10 operates at a temperature of 100 to 300° C. Fuel such as hydrogen is supplied through one of the bipolar plates 20 into a first catalytic layer, and an oxidant such as oxygen is supplied through the other bipolar plate 20 into a second catalytic layer. Then, hydrogen is oxidized into protons in the first catalytic layer, and the protons are conducted to the second catalytic layer through the electrolyte membrane. Then, the protons electrochemically react with oxygen in the second catalytic layer to produce water and generate electrical energy. Moreover, hydrogen supplied as a fuel may be hydrogen produced by reforming hydrocarbons or alcohols. Oxygen supplied as an oxidant may be supplied in the form of air.

The hyper-branched polymer or the cross-linked hyper-branched polymer may function as a binder and thus may constitute an electrode without a common binder. In addition, performance of the electrode may be improved due to addition of the hyper-branched polymer or the cross-linked hyper-branched polymer while using a reduced loading amount of the catalyst in the catalyst layer, compared with general electrodes.

The electrode has improved oxygen permeability and a reduced activation time. In addition, the electrode has excellent heat resistance and phosphoric acid resistance, which make it easier for the electrode to be wet with a doped phosphoric acid.

Thus, a fuel cell including the electrode described above may operate in high-temperature and non-humidified conditions, and may provide improved thermal stability and power generation.

The amount of the hyper-branched polymer or the cross-linked hyper-branched polymer in the electrode may be in a range of about 0.001 to about 0.65 parts by weight, for example, about 0.01 to about 0.05 parts by weight, based on 1 part by weight of the catalyst.

When the amount of the hyper-branched polymer or the cross-linked hyper-branched polymer is within the above range, the wettability of the electrode and the oxygen permeability are improved.

The catalyst may be platinum (Pt), an alloy of platinum (Pt) and at least one metal selected from the group consisting of gold (Au), palladium (Pd), rhodium (Ru), iridium (Ir), ruthenium (Ru), tin (Sn), molybdenum (Mo), cobalt (Co), and chromium (Cr), or a mixture of at least one selected from the group consisting of gold (Au), palladium (Pd), rhodium (Ru), iridium (Ir), ruthenium (Ru), tin (Sn), molybdenum (Mo), cobalt (Co), and chromium (Cr). The metal catalyst is a support catalyst that is supported by a carbon-based support. For example, the metal catalyst may include at least one selected from the group consisting of Pt, PtCo, and PtRu. Such a metal catalyst may be supported by a carbon-based support.

The electrode may further include a binder commonly used in the manufacture of an electrode for a fuel cell.

Examples of the binder may include at least one selected from the group consisting of poly(vinylidenefluoride), polytetrafluoroethylene (PTFE), a tetrafluoroethylene-hexafluoroethylene copolymer, fluorinated ethylene propylene (FEP), a styrene butadiene rubber (SBR), and polyurethane.

The amount of the binder may be in a range of about 0.001 to about 0.5 parts by weight based on 1 part by weight of the catalyst. When the amount of the binder is within the above range, the wettability of the electrode may be improved.

The electrode may further include a second hyper-branched polymer disclosed in Korean Patent Application No. 2009-125700 (U.S. Patent Publication No. 2010/0159347) filed by the applicant of the present invention, the disclosure of which is incorporated here by reference.

The amount of the second hyper-branched polymer may be in a range of about 0.001 to about 0.65 parts by weight, for example, about 0.01 to about 0.05 parts by weight based on 1 part by weight of the catalyst.

For example, the second hyper-branched polymer may be a compound represented by Formula 17 below.

[Formula 17]
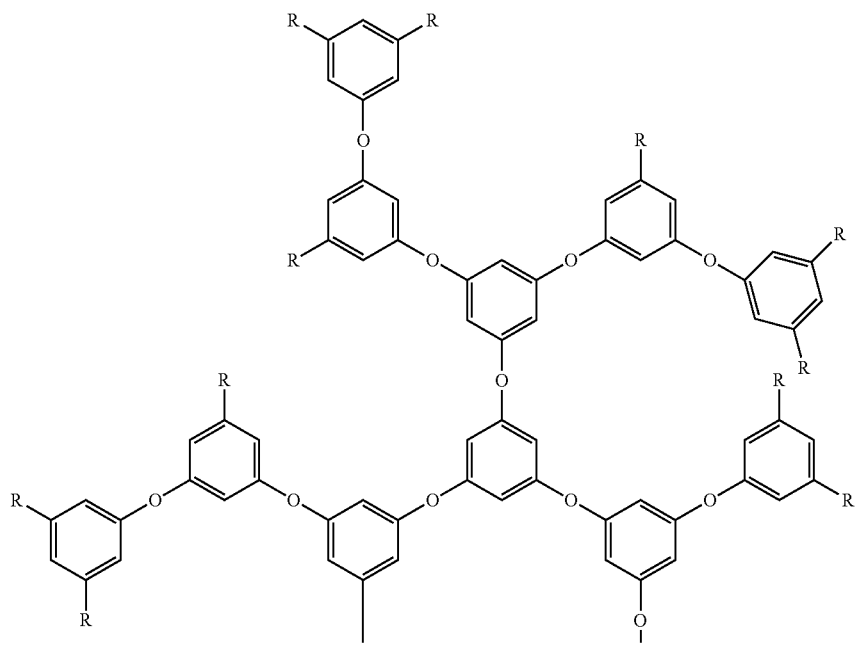
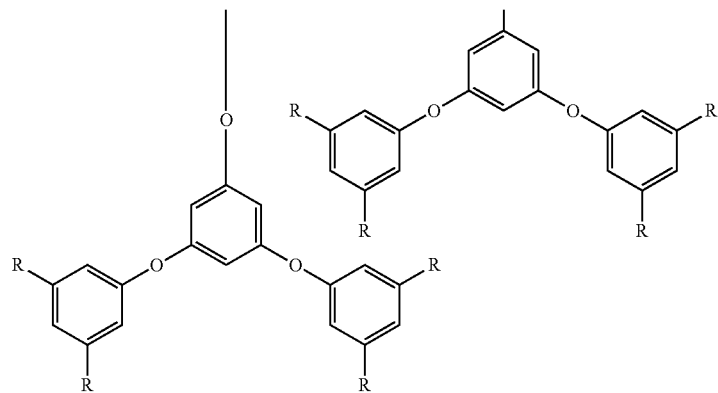
wherein, in Formula 17, R may be fluorine, a trifluoromethyl group, a 3,5-difluorophenyl group, or one selected from the groups represented by the following formulae:
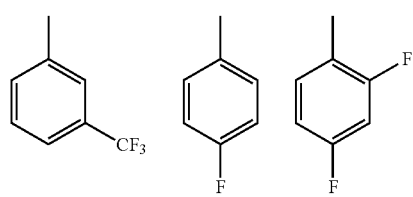
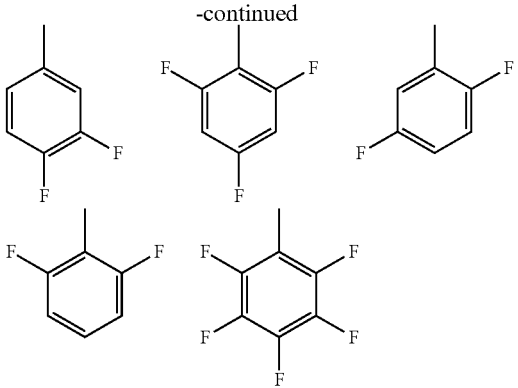
The compound of Formula 17 may be a compound represented by Formula 18 or Formula 19.

[Formula 18]
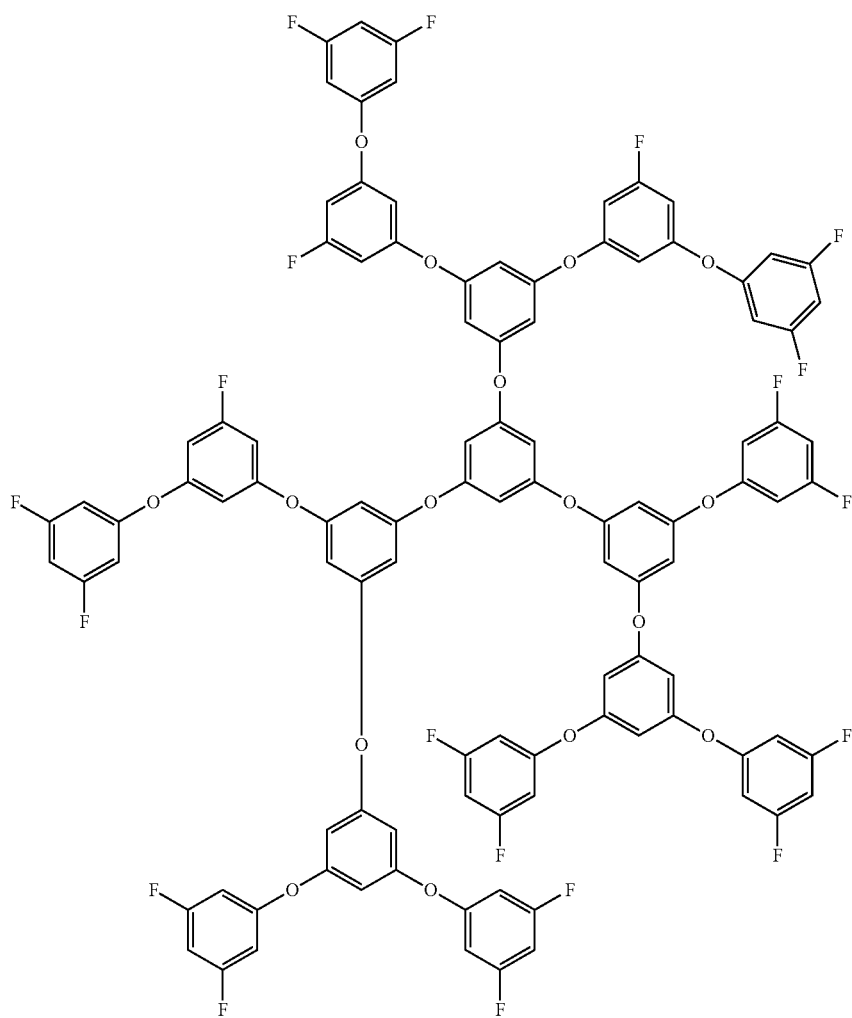
The compound represented by Formula 18 may have a degree of branching of about 0.05 to about 0.9, for example, about 0.63 to about 0.9, and may have a number-average molecular weight of about 8,000 to about 12,000.
[Formula 19]
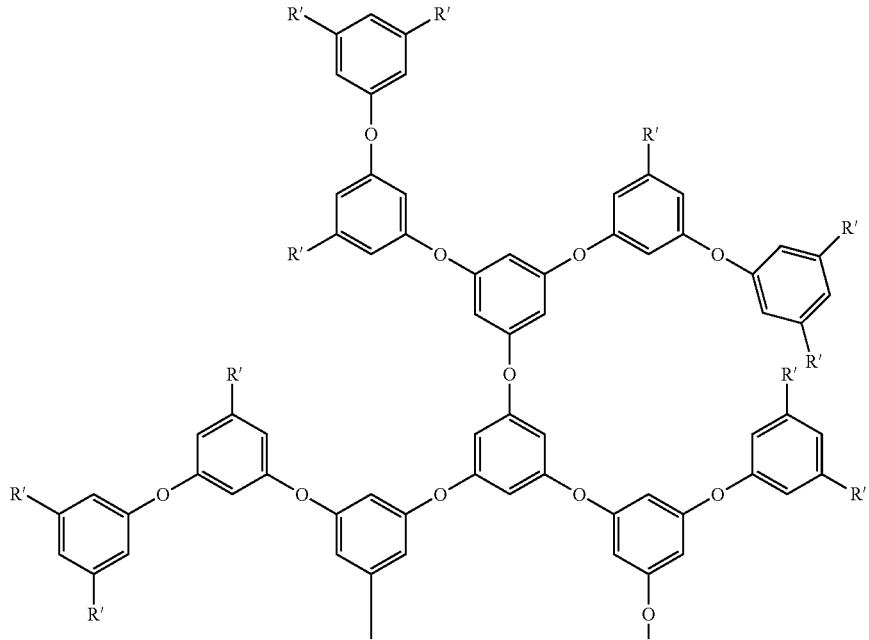

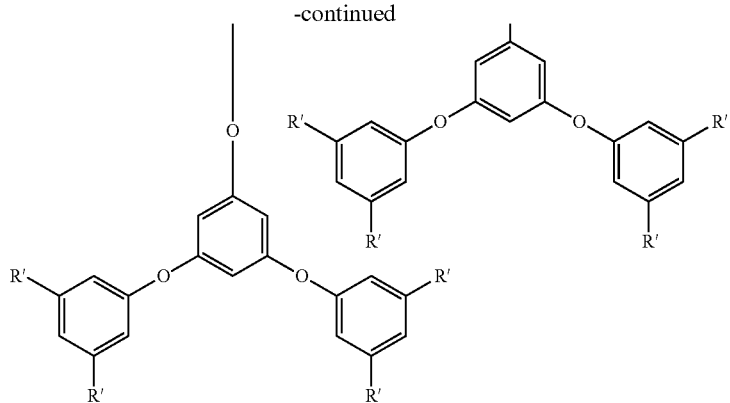

In Formula 19, R' is a pentafluorophenyl group. The compound represented by Formula 19 may have a degree of branching of about 0.05 to about 0.9, for example, about 0.63 to about 0.9, and may have a number-average molecular weight of about 12,000 to about 15,000.

A method of manufacturing the electrode for a fuel cell as described above will now be described.

First, a catalyst is dispersed in a solvent to obtain a dispersion solution. The solvent may be N-methylpyrrolidone (NMP), dimethylacetamide (DMAc), or the like. The amount of the solvent may be in a range of about 1 to about 10 parts by weight based on 1 part by weight of the catalyst.

A mixture including the hyper-branched polymer, for example, the hyper-branched polymer of Formula 9 or 10, is added to and mixed with the dispersion solution, and stirred.

When an electrode including a cross-linked hyper-branched polymer is manufactured, the benzoxazine-based monomer, or both the benzoxazine-based monomer and the cross-linking compound may be further added to the mixture including the hyper-branched polymer.

The solvent may be N-methylpyrrolidone (NMP), dimethylacetamide (DMAc), or the like.

The resultant mixture is coated on a carbon support, thereby completing manufacture of the electrode.

Herein, the carbon support may be fixed on a glass substrate to facilitate the coating. A method of coating is not particularly restricted and coating using a doctor blade, bar coating, or screen printing may be used.

The coated resultant is dried at a temperature in a range of about 20 to about 150° C. to remove the solvent. The drying time may vary according to the drying temperature and may be in a range of about 10 to about 60 minutes.

When an electrode including a cross-linked hyper-branched polymer is manufactured, a thermal treatment may be further performed at about 50 to about 250° C. after the coated resultant is dried.

The catalyst layer of the electrode may further include at least one proton conductor selected from a phosphoric acid and a $C_1$-$C_{20}$ organic phosphonic acid. The amount of the proton conductor may be in a range of about 10 to about 1,000 parts by weight based on 100 parts by weight of the total weight of the electrode. The concentration of the acid is not particularly restricted. However, when a phosphoric acid is used, an 85 wt % phosphoric acid aqueous solution may be used. The impregnation time of the phosphoric acid may be in a range of about 2.5 to about 14 hours at about 80° C.

Examples of the $C_1$-$C_{20}$ organic phosphonic acid may include a methyl phosphonic acid and an ethyl phosphonic acid.

According to another embodiment of the present invention, there is provided an electrolyte membrane for a fuel cell, the electrolyte membrane including the hyper-branched polymer or the cross-linked hyper-branched polymer.

According to another embodiment of the present invention, there is provided an electrolyte membrane for a fuel cell, the electrolyte membrane including the hyper-branched polymer composition.

The electrolyte membrane reduces problems caused when an electrolyte membrane formed of polybenzimidazole alone is used, such as a pin-hole phenomenon caused by mechanical and chemical instability at high temperatures. In addition, the oxygen permeability of the electrode increases and the amount of dissolved oxygen in the electrode increases, thereby reducing the activation time of the electrode.

Hereinafter, an electrolyte membrane including the hyper-branched polymer and a method of preparing the electrolyte membrane according to an embodiment of the present invention will be described.

The electrolyte membrane including the hyper-branched polymer may be prepared in the same manner as generally preparing an electrolyte membrane including polybenzimidazole (PBI), except that the hyper-branched polymer is used alone in the electrolyte membrane including the hyper-branched polymer instead of PBI.

A method of preparing an electrolyte membrane including a cross-linked hyper-branched polymer is as follows.

In order to prepare the electrolyte membrane, the hyper-branched polymer described above and a benzoxazine-based monomer, or the hyper-branched polymer, a benzoxazine-based monomer and a cross-linking compound are blended, and then cured at about 50° C. to about 250° C., for example, at about 80° C. to about 220° C. Subsequently, the resultant is impregnated with a proton conductor, such as an acid, to form the electrolyte membrane.

The type and amount of the cross-linking compound, and the amount of the hyper-branched polymer are the same as described above.

A tape casting method or a general coating method may be used to form the electrolyte membrane. Examples of the coating method may include casting the mixture on a support using a doctor blade. Herein, a doctor blade with a gap of about 250 to 500 µm is used.

When the casting method using a doctor blade is used, the method of preparing the electrolyte membrane may further include separating the electrolyte membrane from the support, after curing and before impregnating with an acid, and removing the support. When the support is to be removed, the electrolyte membrane adhered to the support is immersed in distilled water at a temperature range of about 60 to about 80° C.

The support may be any suitable support for the electrolyte membrane as long as the support may support the electrolyte membrane and may be, for example, a glass substrate, a polyimide film, or the like. When the tape casting method is used, a tape-cast membrane is separated from a support, such as polyethyleneterephthalate, before being cured, and is then put into an oven for curing. Thus, the process of removing the support after curing is unnecessary.

In addition, when the electrolyte membrane is formed by the tape casting method using the hyper-branched polymer composition including the hyper-branched polymer and the benzoxazine-based monomer, or the hyper-branched polymer composition including the hyper-branched polymer, the benzoxazine-based monomer, and the cross-linking compound, a process of filtering the composition may be further performed.

The tape-cast membrane is thermally treated to induce a curing reaction, and then impregnated with a proton conductor, such as an acid, to complete manufacture of the electrolyte membrane.

A method of manufacturing a membrane and electrode assembly (MEA) of a fuel cell will now be described in detail. The term "membrane-electrode assembly (MEA)" refers to a structure in which an electrolyte membrane is disposed between two electrodes, each electrode including a catalyst layer and a diffusion layer.

In order to manufacture the MEA, the electrodes having catalyst layers as described above are respectively disposed on both surfaces of the electrolyte membrane obtained as described above, and incubated under high temperature and high pressure conditions. The electrodes are thereby adhered to both surfaces of the electrolyte membrane, and fuel diffusion layers are then adhered to the electrodes.

For example, the electrolyte membrane may be a polybenzimidazole electrolyte membrane, a polybenzoxazine-polybenzimidazole copolymer electrolyte membrane, or a porous polytetrafluoroethylene (PTFE) membrane, which are commonly used in a fuel cell. Alternatively, an electrolyte membrane including the hyper-branched polymer described above or the cross-linked hyper-branched polymer may be used.

In particular, when the electrolyte membrane including the hyper-branched polymer described above or the cross-linked hyper-branched polymer is used, and the triple-phase interface is formed of the same material, compatibility of the triple phases is improved. As a result, the contact resistance may decrease and maximum performance of the fuel cell may be attained.

The joining may be performed under a pressure of about 0.1 to about 3 ton/cm$^2$, for example, about 1 ton/cm$^2$, at a temperature at which the electrolyte membrane is softened.

Next, bipolar plates are respectively installed on both sides of the MEA, to complete the fuel cell. The bipolar plates may have grooves for supplying fuel and may function as current collectors.

The fuel cell may be used as a polymer electrolyte membrane fuel cell (PEMFC), but is not limited thereto.

Substituents used in the formulae above may be defined as follows.

In the Formulae, the alkyl group may be linear or branched. Examples thereof may include, but are not limited to, a methyl group, an ethyl group, a propyl group, an isobutyl group, a sec-butyl group, a pentyl group, an iso-amyl group, a hexyl group, a heptyl group, an octyl group, a nonanyl group, and a dodecyl group. At least one hydrogen atom of the alkyl group may be substituted with a heavy hydrogen atom, a halogen atom, a hydroxy group, a nitro group, a cyano group, an amino group, an amidino group, hydrazine, hydrazone, a carboxyl group or a salt thereof, a sulfonic acid group or a salt thereof, a phosphoric acid group or a salt thereof, a $C_1$-$C_{10}$ alkyl group, a $C_1$-$C_{10}$ alkoxy group, a $C_2$-$C_{10}$ alkenyl group, a $C_2$-$C_{10}$ alkynyl group, a $C_6$-$C_{16}$ aryl group, or a $C_4$-$C_{16}$ heteroaryl group.

The alkoxy group used herein is a group having a structure of —OA (A is an unsubstituted $C_1$-$C_{50}$ alkyl group as described above). Examples thereof may include, but are not limited to, a methoxy group, an ethoxy group, a propoxy group, an isopropyloxy group, a butoxy group, and a pentoxy group. At least one hydrogen atom of the alkoxy group may be substituted with the same substituent groups as described above in connection with the alkyl groups.

The aryl group in the Formulae above may be used alone or in combination, and refers to an aromatic system containing at least one ring, wherein the rings may be attached to each other using a pedant method, or fused with each other. The term "aryl" refers to an aromatic radical including a phenyl, a naphthyl, a tetrahydronaphthyl, or the like. At least one hydrogen atom of the aryl group may be substituted with the same substituent as described above in connection with the alkyl group.

The heteroaryl group used in the Formulae above refers to an aromatic organic compound that includes at least one heteroatom selected from among nitrogen (N), oxygen (O), phosphorous (P) and sulfur (S) and remaining ring atoms of C. At least one hydrogen atom of the heteroaryl group may be substituted with a substituent described above with reference to the alkyl group.

The heterocyclic group in the Formulae above refers to a ring containing a heteroatom, such as nitrogen, sulfur, phosphorus, oxygen, or the like. At least one hydrogen atom of the heterocyclic group may be substituted with the same substituent as in the aryl group.

The carbon ring group in the Formulae above may be a ring type alkyl group. At least one hydrogen atom of the carbon ring group may be substituted with the same substituent as described above in connection with the aryl group.

The condensed polycyclic group used in the Formulae above refers to a substituent including at least two rings wherein at least one aromatic ring and/or at least one non-aromatic ring are fused to each other. At least part of the aryl group or the heteroaryl group may be included in the condensed polycyclic group. At least one hydrogen atom of the condensed polycyclic group may be substituted with the same substituent as described above in connection with the alkyl group.

In the Formulae above, the alkylene group may include, for example, methylene or ethylene, and at least one hydrogen atom of the alkylene group may be substituted with the same substituent as described above in connection with the alkyl group.

In the Formulae above, at least one hydrogen atom of the alkenylene group and the alkynylene group may be substituted with the same substituent as described above in connection with the alkyl group.

In the Formulae above, the arylene group may include, for example, phenylene or biphenylene, and at least one hydrogen atom of the arylene group may be substituted with the same substituent as described above in connection with the alkyl group.

At least one hydrogen atom of the heteroarylene group in the Formulae above may be substituted with the same substituent as described above in connection with the alkyl group.

In the Formulae above, at least one hydrogen atom of the heteroaryloxy group, an arylalkyl group, an aryloxy group, a carbon ring alkyl group, a heterocyclic alkyl group, and a heteroarylalkyl group may be substituted with the same substituents as described above in connection with the alkyl group.

In the Formulae, the term "halogenated" denotes that when the compounds are substituted with a halogen atom such as fluorine, chlorine, bromine, or iodine, the $C_1$-$C_{30}$ alkyl group containing the halogen atom, the compounds are substituted with the $C_6$-$C_{30}$ aryl group containing the halogen atom, the $C_2$-$C_{30}$ heteroaryl group containing the halogen atom, or the $C_1$-$C_{20}$ heterocyclic containing the halogen atom.

Hereinafter, one or more embodiments of the present invention will be described in detail with reference to the following examples. However, these examples are not intended to limit the purpose and scope of the one or more embodiments of the present invention.

SYNTHESIS EXAMPLE 1

Preparation of Hyper-branched Polymer of Formula 9

Nitrogen was injected into a 25 ml two neck round-bottom flask and 1 g of bis(4-isocyanatophenyl)methane (MDI) (4.00 mmol) was dissolved in 10 ml N,N'-dimethylacetamide (DMAc), thereby obtaining a MDI solution.

In addition, 0.8 g of 3,3'-dihydroxydiphenylamine (DHDPA) (4.00 mmol) was dissolved in 8 ml of DMAc so that a DHDPA solution was prepared.

The DHDPA solution was added to the MDI solution at about −5° C. and then was stirred for about 30 minutes to prepare a mixture. Then, 0.01 mol % of dibutyltin dilaurate, based on 1 mol of MDI, was added to the mixture and was polymerized for about 120 hours at about 115° C. to prepare a reaction solution.

Color of the reaction solution was gradually changed to dark brown.

The polymerization solution, in which reaction was completed, was poured into 36 ml of distilled water, thereby forming a precipitate.

The precipitate was washed with tetrahydrofuran (THF) and then sufficiently dried for about 24 hours in an oven, thereby obtaining the hyper-branched polymer of Formula 9.

The structure of the hyper-branched polymer of Formula 9 was identified by using a nuclear magnetic resonance (NMR) analysis method.

SYNTHESIS EXAMPLE 2

Preparation of Hyper-branched Polymer ($R_2$=Pentafluorophenyl) of Formula 10

Nitrogen was injected into a 25 ml two neck round-bottom flask and 0.5 g of the compound of Formula 9 was dissolved in 5 ml of N,N'-dimethylacetamide (DMAc), thereby obtaining a compound solution.

1 g of pentafluorophenyl isocyanate and 10 ml of N,N'-dimethylacetamide (DMAc) were mixed and stirred to prepare a mixture. The compound solution was added to the mixture.

Then, 0.01 mol % of dibutyltin dilaurate, based on 1 mol of pentafluorophenyl isocyanate, was added to the resulting mixture and was polymerized for about 24 hours at about 80° C.

The polymerization solution, in which reaction was completed, was poured into 30 ml of distilled water, thereby forming a precipitate.

The precipitate was filtered and then sufficiently dried for about 24 hours in an oven, thereby obtaining the hyper-branched polymer ($R_2$=pentafluorophenyl) of Formula 10.

A structure of the compound of Formula 10 was identified using a nuclear magnetic resonance (NMR) analysis method. The results are shown in FIG. 1. NMR used in a $^{19}$F-nuclear magnetic resonance ($^{19}$F-NMR) analysis spectrum and a NMR analysis method is Unity NOVA600 manufactured by Varian operated at 600 MHz and a solvent for dissolving a sample was DMSO-$d_6$.

Figure 2:
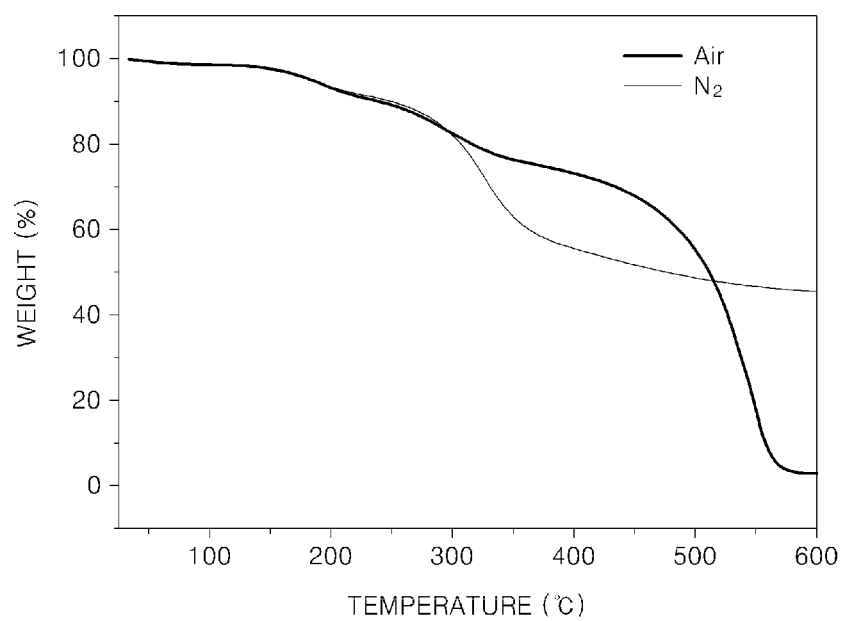
FIG. 2 is a graph showing thermal characteristics of a hyper-branched polymer obtained according to Synthesis Example 1.

Thermal characteristics of the hyper-branched polymer obtained according to Synthesis Example 1 were measured by thermogravimetric analysis (TGA) and the results are shown in FIG. 2. The TGA was performed while increasing a temperature to about 800° C. at a increasing rate of 10° C./min under a nitrogen or air atmosphere, wherein nitrogen or air flowed at a rate of 35 ml/min.

Referring to FIG. 2, thermal stability of the hyper-branched polymer obtained according to Synthesis Example 1 may be secured from about 230 to about 293° C. and thus thermal stability is excellent.

The molecular weights of the compounds obtained according to Synthesis Examples 1 and 2 were measured using gel permeation chromatography (GPC) and the results are shown in Table 1.

TABLE 1

|  | Synthesis Example 1 | Synthesis Example 2 |
|---|---|---|
| Mn | 1,291,490 | 1,939,610 |
| Mw | 2,196,080 | 2,839,770 |
| Mp | 2,076,100 | 2,458,620 |
| Mz | 2,916,650 | 3,664,920 |
| Mz + 1 | 3,675,580 | 4,463,790 |
| Polydispersity | 1.70 | 1.46 |

In Table 1, Mn represents a number-average molecular weight, Mw represents a weight average molecular weight, Mp represents a peak weight average molecular weight, Mz represents a z-weight average molecular weight, and Mz+1 represents a z+1 weight average molecular weight.

EXAMPLE 1

Manufacture of Electrodes for Fuel Cells and a Fuel Cell Including the Electrodes 1 g of a catalyst including 50 weight % of PtCo supported by carbon, and 3 g of N-methylpyrrolidone (NMP) as a solvent were added to a stirring vessel, and the mixture was stirred to prepare a slurry. The NMP solution of the compound of Formula 9 obtained according to Synthesis Example 1 was mixed to the slurry and further added and stirred until the slurry contained 0.013 g of the compound of Formula 9, thereby preparing a slurry for a cathode catalyst layer.

Carbon paper was cut to a size of 4×7 cm², fixed on a glass plate, and coated with the slurry by using a doctor blade (Sheen Instruments Ltd) having a gap of about 600 μm.

The slurry for the cathode catalyst layer was coated on the carbon paper and dried at room temperature for one hour, at 80° C. for one hour, at 120° C. for 30 minutes, and at 150° C. for 15 minutes to form cathodes (fuel electrodes). The amount of Pt in PtCo supported by the cathode was about 1.7 mg/cm².

Anodes were manufactured as follows.

2 g of a catalyst including 50 weight % of Pt supported by carbon, and 9 g of NMP as a solvent were put added to a stirring vessel, and the mixture was stirred for 2 minutes by using a high-speed stirrer.

Then, a solution of 0.05 g of polyvinylidene fluoride dissolved in 1 g of NMP was added to the mixture, and the resultant was further stirred for 2 minutes to prepare a slurry for an anode catalyst layer. The slurry was coated on carbon paper, which was coated with a microporous layer, using a bar coater, to complete the manufacture of the anode.

Separately, 60 parts by weight of a benzoxazine-based monomer A represented by a formula below, 3 parts by weight of a benzoxazine-based monomer B represented by a formula below, and 37 parts by weight of polybenzimidazole were blended together, and then cured at about 220° C.

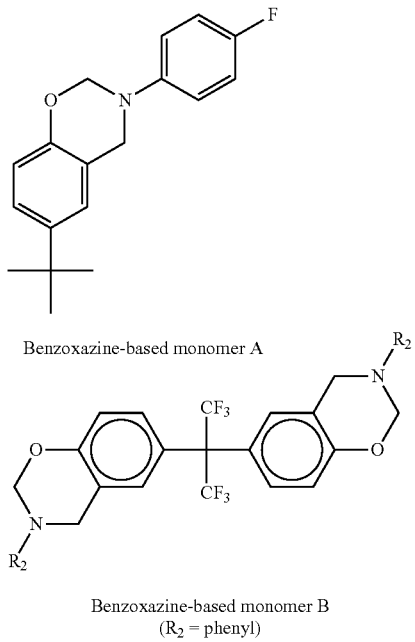

Benzoxazine-based monomer A

Benzoxazine-based monomer B
($R_2$ = phenyl)

Subsequently, the resultant was impregnated with 85 weight % of a phosphoric acid at about 80° C. for 4 hours or longer to form an electrolyte membrane. Herein, the amount of phosphoric acid was about 480 parts by weight based on 100 parts by weight of the electrolyte membrane.

The electrolyte membrane was disposed between the cathode and the anode to manufacture a membrane-electrode assembly (MEA). The cathode and the anode were not impregnated with a phosphoric acid.

To prevent gas permeation between the cathode and the anode, a TEFLON membrane as a main-gasket having a thickness of 200 μm and a TEFLON membrane as a sub-gasket having a thickness of 20 μm were joined and disposed between each of the anode and cathode, and the electrolyte membrane. The pressure applied to the MEAs was adjusted using a torque wrench, and was stepwise increased using 1, 2, and 3 N-m Torque wrenches.

Electricity was generated by supplying hydrogen to the anode (flow rate: 100 ccm) and air to the cathode (flow rate: 250 ccm) at 150° C., without humidifying the electrolyte membrane, and characteristics of the fuel cell were measured. Herein, an electrolyte doped with a phosphoric acid was used and thus, the performance of the fuel cell was improved over time. Accordingly, aging was performed until an operating voltage reached a peak voltage, and finally, the characteristics of the fuel cell were evaluated. In addition, the areas of the cathode and anode were fixed to a size of 2.8×2.8 (7.84 cm$^2$), and the thicknesses of the cathode and the anode were about 430 μm and about 390 μm, respectively.

EXAMPLE 2

Manufacture of Electrodes for Fuel Cells and a Fuel Cell Including the Electrodes A cathode and a fuel cell using the cathode were manufactured in the same manner as in Example 1, except that the amount of the hyper-branched polymer of Formula 9 is changed to 0.007 g in manufacturing of the cathode.

EXAMPLE 3

Manufacture of Electrodes for Fuel Cells and a Fuel Cell Including the Electrodes A cathode and a fuel cell using the cathode were manufactured in the same manner as in Example 1, except that 0.013 g of HPEF of Formula 19 below was further added and the amount of the hyper-branched polymer of Formula 9 obtained according to Synthesis Example 1 is changed to 0.007 g in manufacturing of the cathode.

[Formula 19]

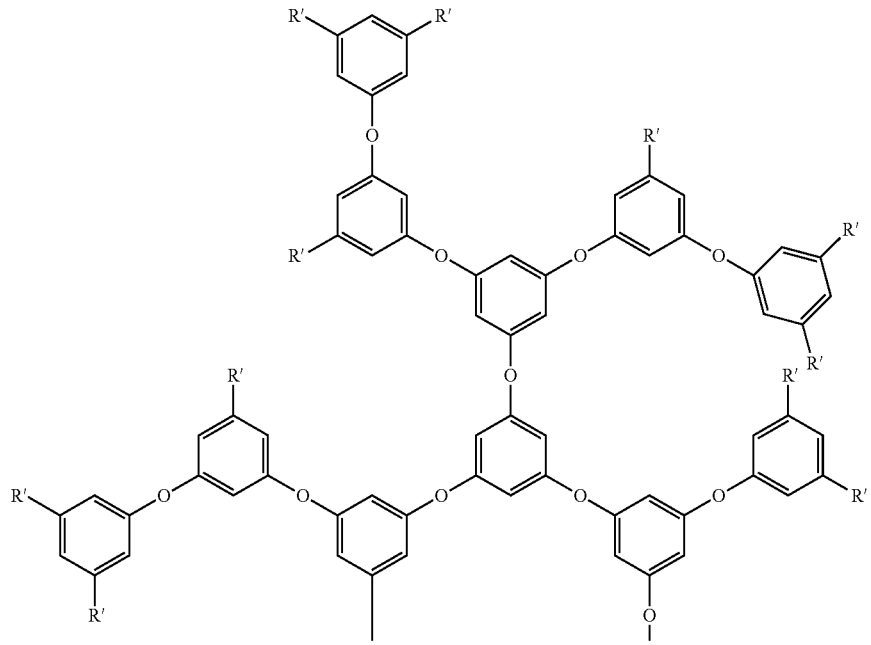

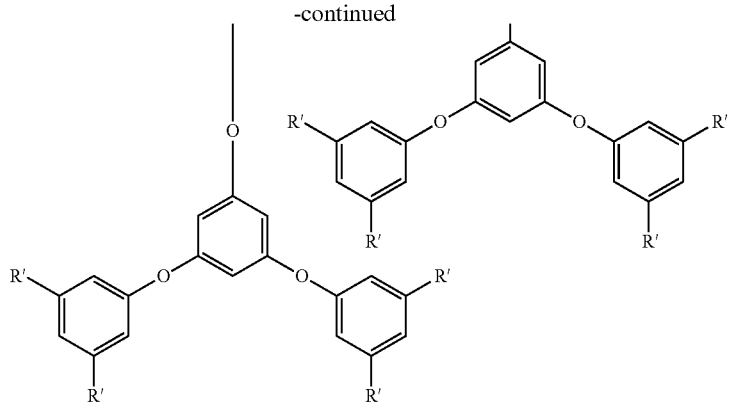

wherein R' is a pentafluorophenyl group.

EXAMPLE 4

Manufacture of Electrodes for Fuel Cells and a Fuel Cell Including the Electrodes A cathode and a fuel cell using the cathode were manufactured in the same manner as in Example 1, except that the compound ($R_2$=pentafluorophenyl) of Formula 10 was used instead of the compound of Formula 9 obtained according to Synthesis Example 1 and polyurethane was used instead of polyvinylidene fluoride in manufacturing of the cathode.

EXAMPLE 5

Manufacture of Electrodes for Fuel Cells and a Fuel Cell Including the Electrodes 1 g of a catalyst including 50 weight % of PtCo supported by carbon, and 3 g of N-methylpyrrolidone (NMP) as a solvent were added to a stirring vessel, and the mixture was stirred using a mortar to prepare a slurry. The NMP solution of the compound of Formula 9 obtained according to Synthesis Example 1 was mixed to the slurry and further added and stirred until the slurry contained 0.013 g of the compound of Formula 9, thereby preparing a slurry for a cathode catalyst layer.

Carbon paper was cut to a size of 4×7 $cm^2$, fixed on a glass plate, and coated with the slurry by using a doctor blade (Sheen Instruments Ltd) having a gap of about 600 μm.

The slurry for the cathode catalyst layer was coated on the carbon paper and dried at room temperature for one hour, at 80° C. for one hour, at 120° C. for 30 minutes, and at 150° C. for 15 minutes to form cathodes (fuel electrodes). The amount of Pt in PtCo supported by the cathode was about 1.7 mg/$cm^2$. Anodes were manufactured as follows.

2 g of a catalyst including 50 weight % of Pt supported by carbon, and 9 g of NMP as a solvent were added to a stirring vessel, and the mixture was stirred for 2 minutes by using a high-speed stirrer.

Then, a solution of 0.05 g of polyvinylidene fluoride dissolved in 1 g of NMP was added to the mixture, and the resultant was further stirred for 2 minutes to prepare a slurry for an anode catalyst layer. The slurry was coated on carbon paper, which was coated with a microporous layer, using a bar coater, to complete the manufacture of the anode.

Separately, 60 parts by weight of a benzoxazine-based monomer 4FPh-2AP represented by a formula below, 37 parts by weight of m-polybenzimidazole (PBI), and 3 parts by weight of the compound of Formula 9 were blended together, and then cured at about 220° C.

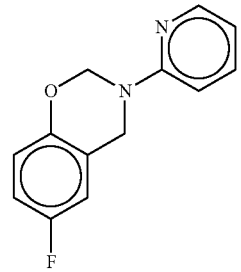

4FPh-2AP

Subsequently, the resultant was impregnated with 85 weight % of a phosphoric acid at about 80° C. for 4 hours or longer to form an electrolyte membrane. Herein, the amount of phosphoric acid was about 480 parts by weight based on 100 parts by weight of the electrolyte membrane.

The electrolyte membrane was disposed between the cathode and the anode to manufacture a MEA. The cathode and the anode were not impregnated with a phosphoric acid.

To prevent gas permeation between the cathode and the anode, a TEFLON membrane as a main-gasket having a thickness of 200 μm and a TEFLON membrane as a sub-gasket having a thickness of 20 μm were joined and disposed between each of the anode and cathode, and the electrolyte membrane. The pressure applied to the MEAs was adjusted using a torque wrench, and was stepwise increased using 1, 2, and 3 N-m Torque wrenches.

Electricity was generated by supplying hydrogen to the anode (flow rate: 100 ccm) and air to the cathode (flow rate: 250 ccm) at 150° C., without humidifying the electrolyte membrane, and characteristics of the fuel cell were measured. Herein, an electrolyte doped with a phosphoric acid was used and thus, the performance of the fuel cell was improved over time. Accordingly, aging was performed until an operating voltage reached a peak voltage, and finally, the characteristics of the fuel cell were evaluated. In addition, the areas of the cathode and anode were fixed to a size of 2.8×2.8 (7.84 $cm^2$), and the thicknesses of the cathode and the anode were about 430 μm and about 390 μm, respectively.

COMPARATIVE EXAMPLE 1

Manufacture of Electrodes for Fuel Cells and a Fuel Cell Including the Electrodes A cathode and a fuel cell using the cathode were manufactured in the same manner as in Example 1, except that 0.025 g of polyvinylidene fluoride, instead of 0.013 g of the hyper-branched polymer of Formula 9, was used to manufacture the cathode.

Cell voltage characteristics of the fuel cells manufactured according to Examples 1 and 2 and Comparative Example 1 with respect to current density were measured. The results are shown in FIG. 2.

Referring to FIG. 2, although a smaller amount of polyvinylidene fluoride was used, the fuel cells of Examples 1 and 2 had improved cell voltage characteristics, as compared to the fuel cell of Comparative Example 1.

Cell voltage characteristics of the fuel cell of Example 3 with respect to current density were measured. The results are shown in FIG. 3.

Figure 3:
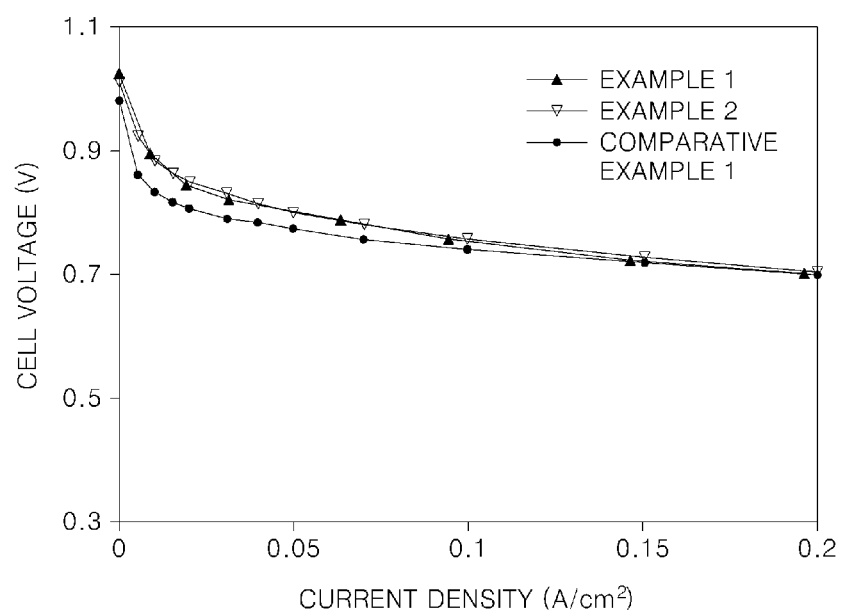
FIG. 3 is a graph showing a cell voltage change with respect to current density in fuel cells manufactured according to Examples 1 and 2 and Comparative Example 1.
Figure 4:
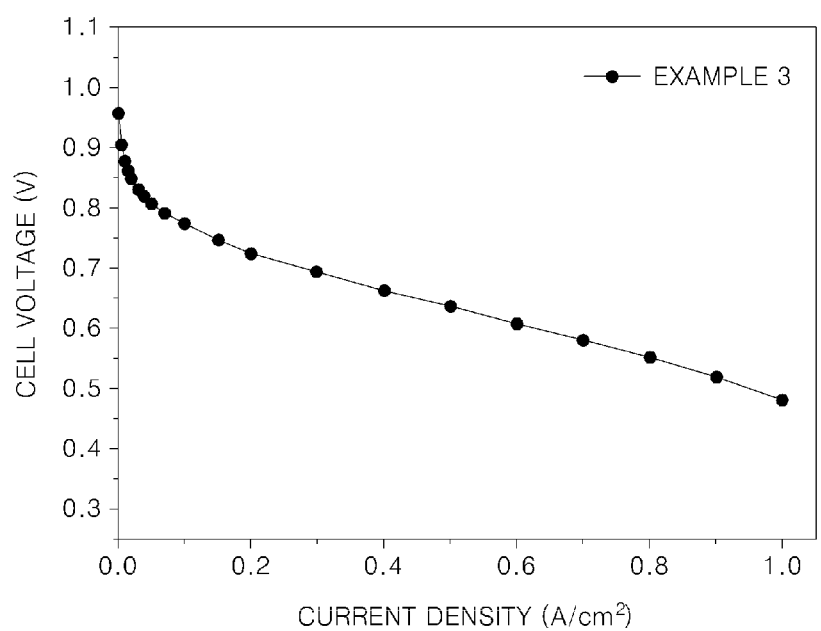
FIG. 4 is a graph showing a cell voltage change according to current density in a fuel cell manufactured according to Example 3.

Referring to FIG. 3, the fuel cell of Example 3 has excellent cell voltage characteristics.

As described above, according to the one or more of the above embodiments of the present invention, the hyper-branched polymer having excellent heat resistance and phosphoric acid resistance, and the cross-linked hyper-branched polymer using the hyper-branched polymer are provided. When electrodes for fuel cells and electrolyte membranes including the hyper-branched polymer or the cross-linked hyper-branched polymer are used in a fuel cell, the fuel cell having improved lifespan and cell performance may be manufactured.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A hyper-branched polymer, which is a product obtained by performing condensation polymerization reaction of a hyper-branched polymer composition comprising a diisocyanate compound represented by Formula 1 and a dihydroxyamine compound represented by Formula 2;

   [Formula 1]

wherein in Formula 1, A is a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, a substituted or unsubstituted $C_6$-$C_{30}$ arylene group, a substituted or unsubstituted $C_6$-$C_{30}$ heteroarylene group, a substituted or unsubstituted $C_4$-$C_{30}$ carbon ring group, or a substituted or unsubstituted $C_6$-$C_{30}$ condensed polycyclic group;

   Formula 2 wherein in Formula 2, $A_1$ and $Ar_2$ are each independently a substituted or unsubstituted $C_2$-$C_{30}$ alkenylene group, a substituted or unsubstituted $C_2$-$C_{30}$ alkynylene group, a substituted or unsubstituted $C_6$-$C_{30}$ arylene group, a substituted or unsubstituted $C_6$-$C_{30}$ heteroarylene group, a substituted or unsubstituted $C_4$-$C_{30}$ carbon ring group, or a substituted or unsubstituted $C_6$-$C_{30}$ condensed polycyclic ring group.

2. The hyper-branched polymer of claim 1, comprising:
a core unit represented by Formula 5 below;
a dendritic unit represented by Formula 6 below;
a linear unit represented by Formula 7 below; and
a terminal unit represented by Formula 8 below

[Formula 5]

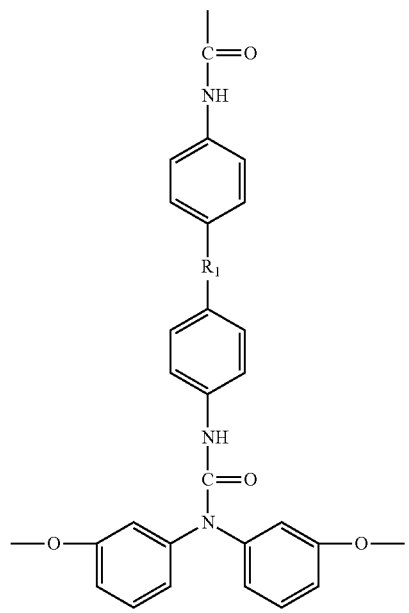

-continued

[Formula 5]

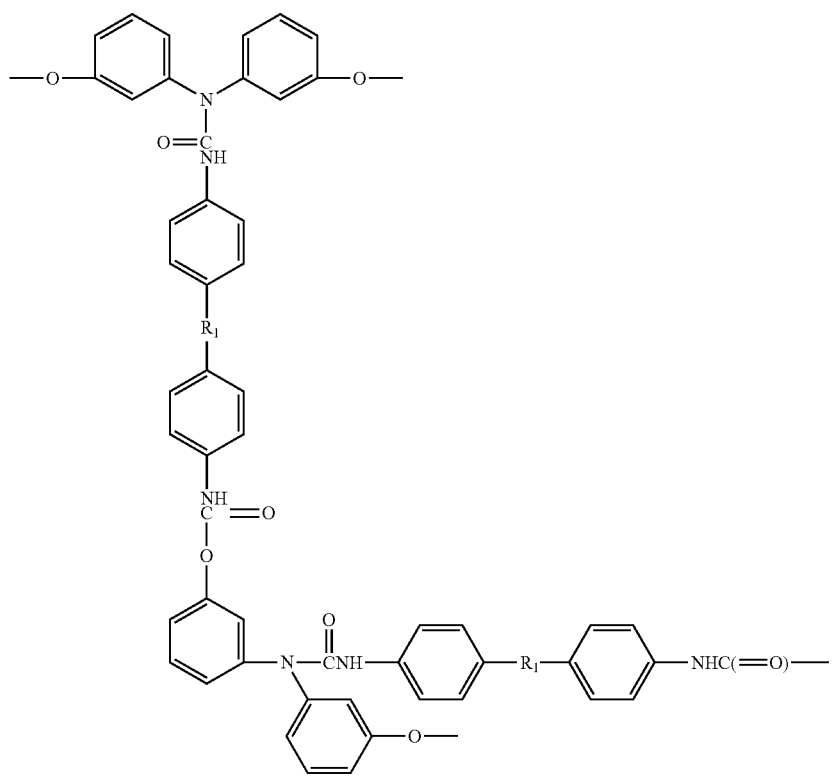

[Formula 6]

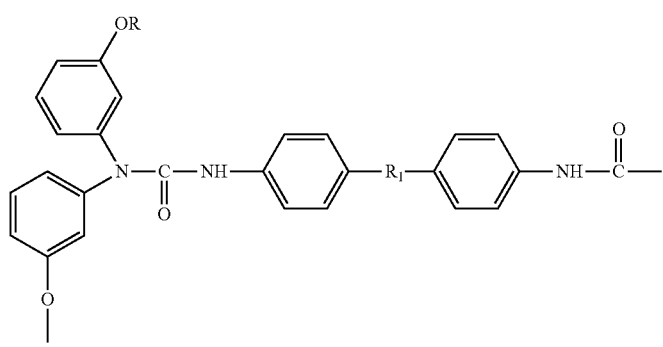

[Formula 7]

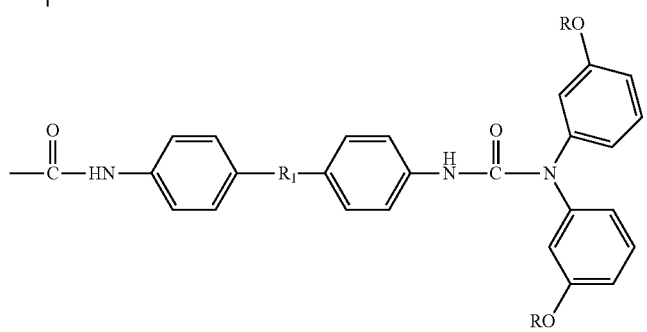

[Formula 8]

wherein in Formulae 5 through 8, $R_1$ represents a single bond, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, a substituted or unsubstituted $C_6$-$C_{30}$ arylene group, a substituted or unsubstituted $C_6$-$C_{30}$ heteroarylene group, substituted or unsubstituted $C_6$-$C_{30}$ carbon ring group, or a substituted or unsubstituted $C_6$-$C_{30}$ condensed polycyclic ring group, R is hydrogen or —C(═O)NH—$R_2$, and $R_2$ represents hydrogen, a substituted or unsubstituted $C_1$-$C_{30}$ alkyl group, a substituted or unsubstituted $C_1$-$C_{30}$ alkoxy group, a substituted or unsubstituted $C_6$-$C_{30}$ aryl group, a substituted or unsubstituted $C_6$-$C_{30}$ carbon ring group, a substituted or unsubstituted $C_6$-$C_{30}$ hetero aryl group, a substituted or unsubstituted $C_2$-$C_{30}$ heterocyclic group, a $C_6$-$C_{30}$ condensed polycyclic group, a halogen atom, a cyano group, a hydroxy group or a carboxyl group.

3. The hyper-branched polymer of claim 2, wherein $R_1$ is —$(CH_2)_a$—, —$(CF_2)_a$—, —$(CCl_2)_a$—, —$C(CH_3)_2$—, —$C(CF_3)_2$—, (a is a positive number in a range of 1 through 5), $C(=O)$, or —$S(=O)_2$—.
4. The hyper-branched polymer of claim 1, wherein the hyper-branched polymer is a compound represented by Formulae 9 through 10 below;
[Formula 9]
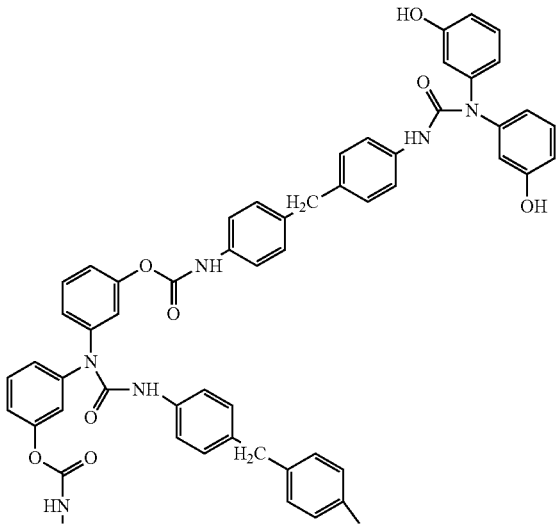
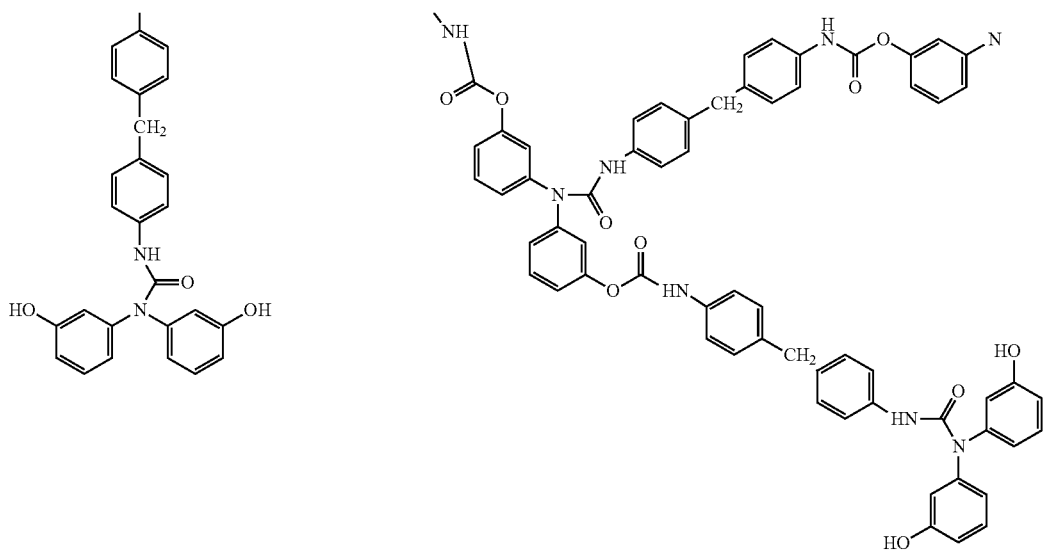

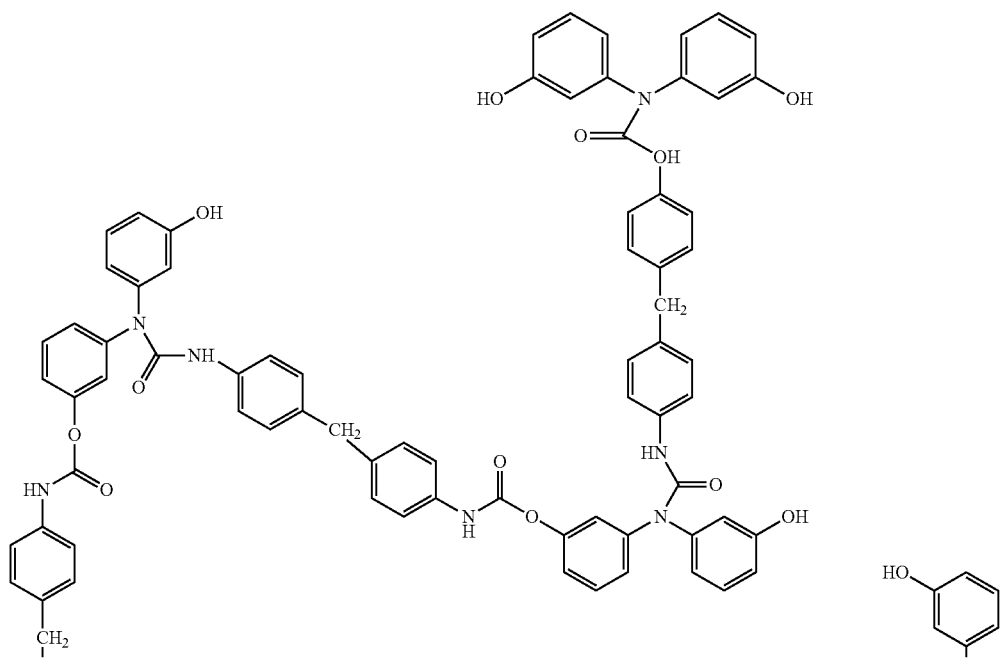
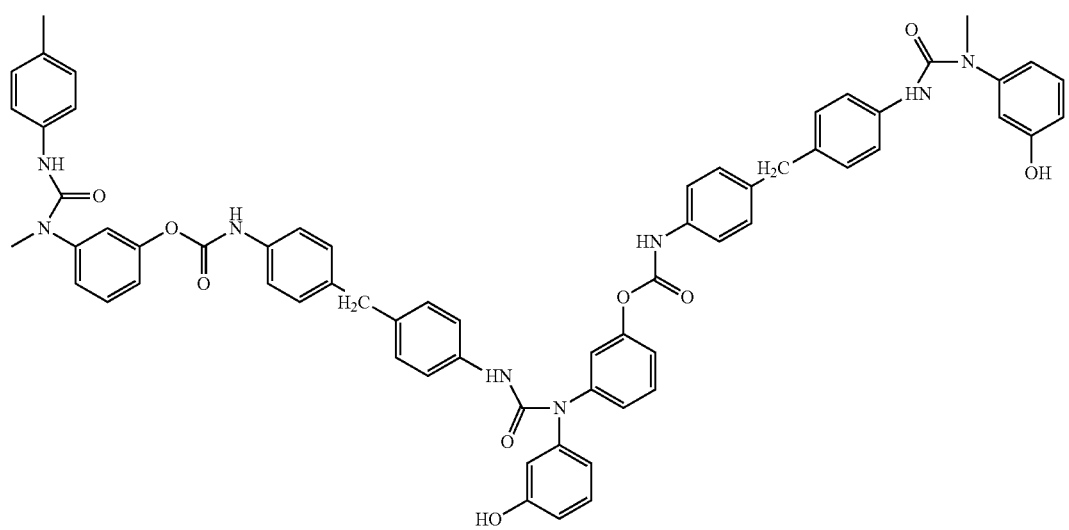

-continued
[Formula 10]
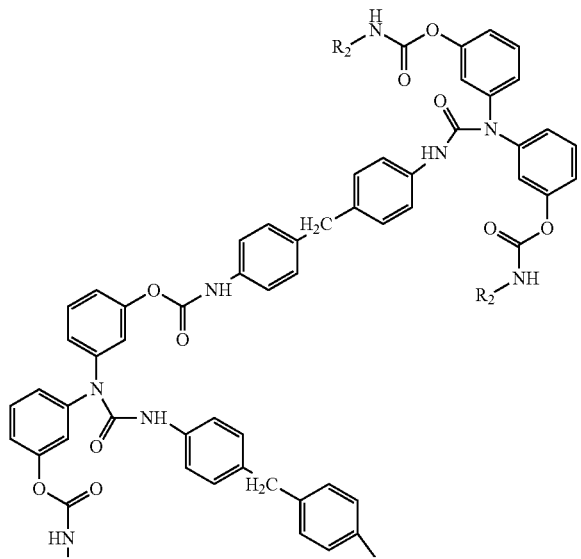
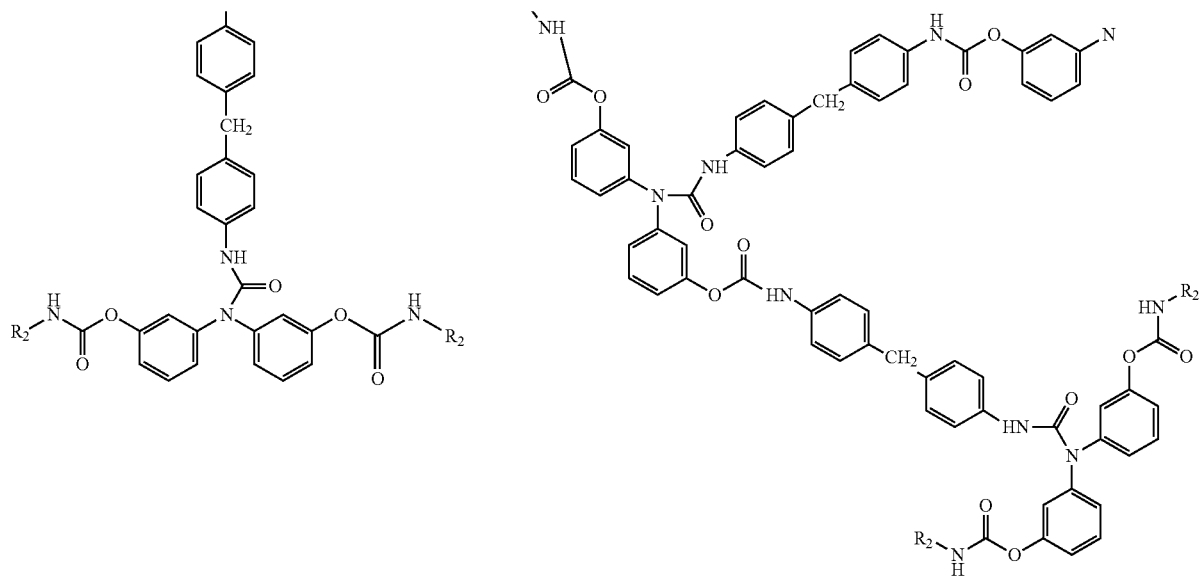

-continued

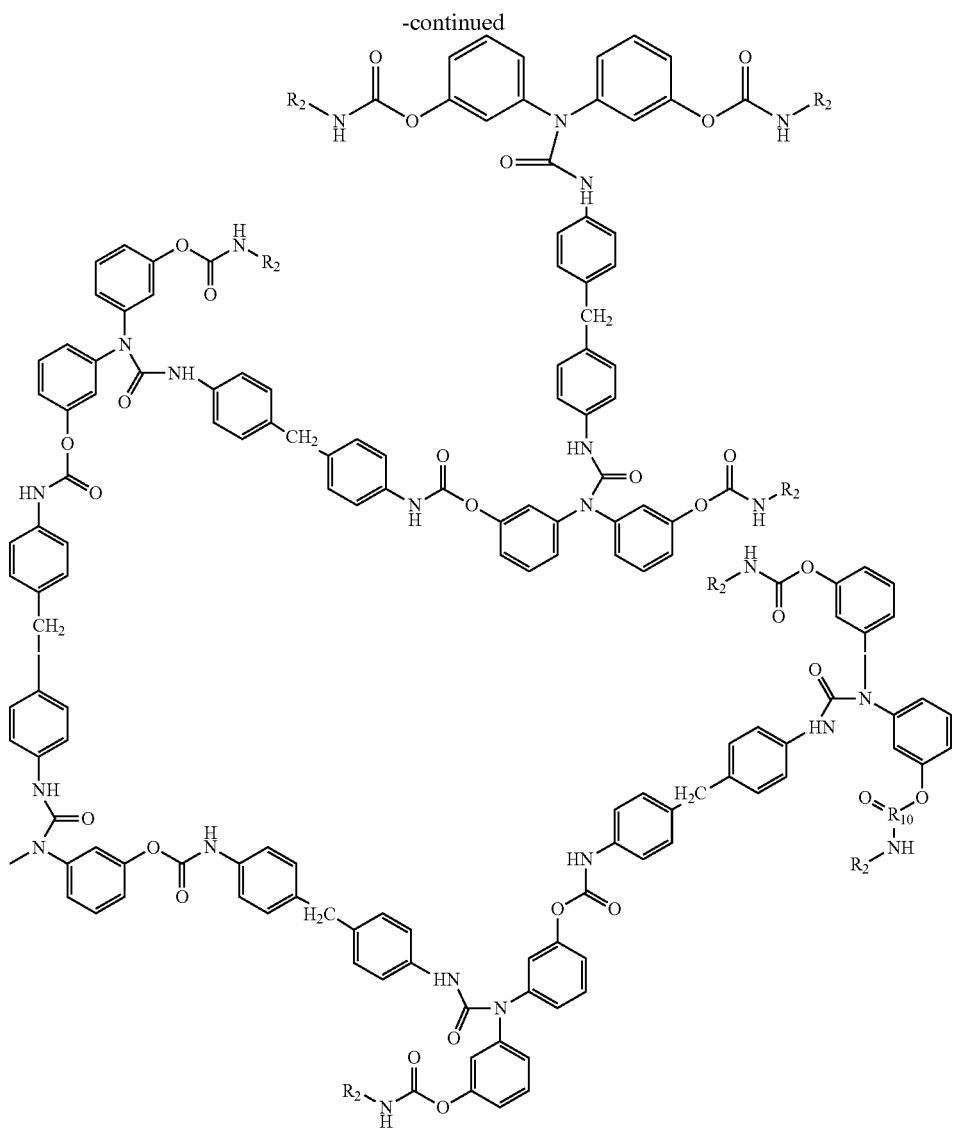

R₂ is selected from the groups represented by the following formulae

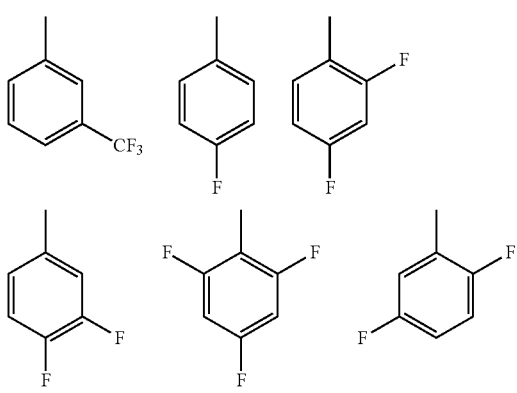

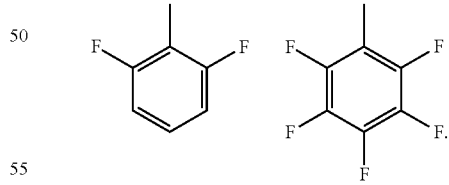

5. The hyper-branched polymer of claim 4, wherein R₂ is pentafluorophenyl.

6. A hyper-branched polymer composition comprising the hyper-branched polymer of claim 1 and a benzoxazine monomer.

7. The hyper-branched polymer composition of claim 6, wherein the benzoxazine monomer comprises at least one compound selected from the group consisting of compounds represented by Formulae 11 through 13 and 15 through 16 below:

[Formula 11]

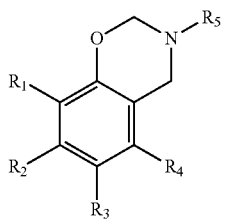

wherein in Formula 11, $R_1$ through $R_4$ are each independently hydrogen, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_6$-$C_{20}$ heteroaryl group, a substituted or unsubstituted $C_6$-$C_{20}$ heteroaryloxy group, a substituted or unsubstituted $C_6$-$C_{20}$ carbon ring group, a substituted or unsubstituted $C_6$-$C_{20}$ carbocyclic alkyl group, a substituted or unsubstituted $C_6$-$C_{20}$ heterocyclic group, a halogen atom, a hydroxy group, or a cyano group; and $R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_6$-$C_{20}$ heteroaryl group, a substituted or unsubstituted $C_6$-$C_{20}$ heteroaryloxy group, a substituted or unsubstituted $C_6$-$C_{20}$ heteroarylalkyl group, a substituted or unsubstituted $C_6$-$C_{20}$ carbon ring group, a substituted or unsubstituted $C_6$-$C_{20}$ carbon ring alkyl group, a substituted or unsubstituted $C_2$-$C_{20}$ heterocyclic group, or a substituted or unsubstituted $C_2$-$C_{20}$ hetero ring alkyl group,

[Formula 12]

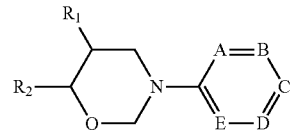

wherein in Formula 12, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_6$-$C_{20}$ heteroaryl group, a substituted or unsubstituted $C_6$-$C_{20}$ heteroaryloxy group, a substituted or unsubstituted $C_6$-$C_{20}$ heteroarylalkyl group, a substituted or unsubstituted $C_6$-$C_{20}$ carbon ring group, a substituted or unsubstituted $C_6$-$C_{20}$ carbon ring alkyl group, a substituted or unsubstituted $C_2$-$C_{20}$ heterocyclic group, or a substituted or unsubstituted $C_2$-$C_{20}$ hetero ring alkyl group; and $R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_6$-$C_{20}$ heteroarylene group, —C(=O)—, and —SO$_2$—,

[Formula 13]

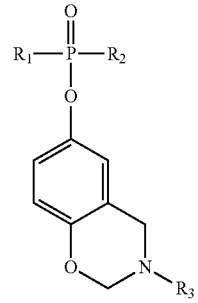

wherein in Formula 13, A, B, C, D and E are all carbon; or one or two of A, B, C, D and E are nitrogen (N) and the others are carbon (C), and $R_1$ and $R_2$ are linked to form a ring, wherein the ring is a $C_6$-$C_{10}$ carbon ring group, a $C_6$-$C_{10}$ heteroaryl group, a fused $C_6$-$C_{10}$ heteroaryl group, a $C_3$-$C_{10}$ heterocyclic group or a fused $C_3$-$C_{10}$ heterocyclic group,

[Formula 15]

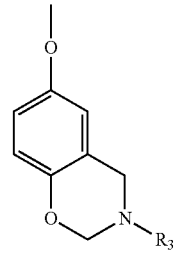

wherein in Formula 15, $R_1$ and $R_2$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 15 A below,

[Formula 15A]

wherein in Formulae 15 and 15A, $R_3$ is each independently hydrogen, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_6$-$C_{20}$ heteroaryl group, a $C_6$-$C_{20}$ heteroaryloxy group, a halogenated $C_6$-$C_{20}$ heteroaryl group, a halogenated $C_6$-$C_{20}$ heteroaryloxy group, a $C_6$-$C_{20}$ carbon ring group, a halogenated $C_6$-$C_{20}$ carbon ring group, a $C_2$-$C_{20}$ heterocyclic group, or a halogenated $C_2$-$C_{20}$ heterocyclic group,

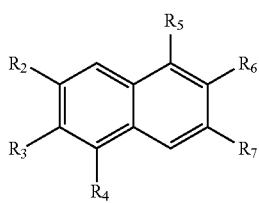

[Formula 16]

wherein in Formula 16, at least two adjacent groups selected from among $R_2$, $R_3$ and $R_4$ are linked to form a group represented by Formula 16A below, and the non-selected remaining group is hydrogen, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_6$-$C_{20}$ heteroaryl group, a $C_6$-$C_{20}$ heteroaryloxy group, a halogenated $C_6$-$C_{20}$ heteroaryl group, a halogenated $C_6$-$C_{20}$ heteroaryloxy group, a $C_6$-$C_{20}$ carbon ring group, a halogenated $C_6$-$C_{20}$ carbon ring group, a $C_2$-$C_{20}$ heterocyclic group or a halogenated $C_2$-$C_{20}$ heterocyclic group, at least two adjacent groups selected from among $R_5$, $R_6$ and $R_7$ are linked to form the group represented by Formula 16A below, and the non-selected remaining group is a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_6$-$C_{20}$ heteroaryl group, a $C_6$-$C_{20}$ heteroaryloxy group, a halogenated $C_6$-$C_{20}$ heteroaryl group, a halogenated $C_6$-$C_{20}$ heteroaryloxy group, a $C_6$-$C_{20}$ carbon ring group, a halogenated $C_6$-$C_{20}$ carbon ring group, a $C_2$-$C_{20}$ heterocyclic group or a halogenated $C_2$-$C_{20}$ heterocyclic group,

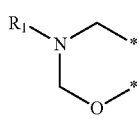

[Formula 16A]

wherein in Formula 16A, $R_1$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_6$-$C_{20}$ heteroaryl group, a substituted or unsubstituted $C_6$-$C_{20}$ heteroaryloxy group, a substituted or unsubstituted $C_6$-$C_{20}$ heteroarylalkyl group, a substituted or unsubstituted $C_6$-$C_{20}$ carbon ring group, a substituted or unsubstituted $C_6$-$C_{20}$ carbon ring alkyl group, a substituted or unsubstituted $C_2$-$C_{20}$ heterocyclic group, or a substituted or unsubstituted $C_2$-$C_{20}$ heterocyclic alkyl group, and

* denotes the sites at which the at least two adjacent groups selected from among $R_2$, $R_3$ and $R_4$ of Formula 16 and the at least two adjacent groups selected from among $R_5$, $R_6$ and $R_7$ are linked, respectively.

8. The hyper-branched polymer composition of claim 6, further comprising a cross-linking compound.

9. The hyper-branched polymer composition of claim 8, wherein the cross-linking compound comprises at least one compound selected from the group consisting of polybenzimidazoles (PBI), polybenzthiazoles, polybenzoxazoles, and polyimides.

10. The hyper-branched polymer composition of claim 8, wherein the amount of the cross-linking compound is in a range of about 5 to about 95 parts by weight based on 100 parts by weight of the benzoxazine monomer.

11. The hyper-branched polymer composition of claim 6, wherein the amount of the hyper-branched polymer is in a range of about 0.1 to about 10 parts by weight based on 100 parts by weight of the benzoxazine monomer.

12. A cross-linked hyper-branched polymer, which is a product of cross-linking reaction of the hyper-branched polymer composition of claim 6.

13. The cross-linked hyper-branched polymer of claim 12, wherein the benzoxazine monomer contained in the hyper-branched polymer composition comprises at least one compound selected from the group consisting of compounds represented by Formulae 11 through 13 and 15 through 16 below;

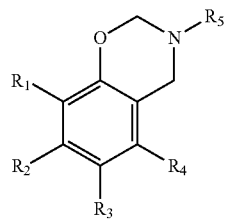

[Formula 11]

wherein in Formula 11, $R_1$ through $R_4$ are each independently hydrogen, a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_6$-$C_{20}$ heteroaryl group, a substituted or unsubstituted $C_6$-$C_{20}$ heteroaryloxy group, a substituted or unsubstituted $C_4$-$C_{20}$ carbon ring group, a substituted or unsubstituted $C_4$-$C_{20}$ carbocyclic alkyl group, a substituted or unsubstituted $C_2$-$C_{20}$ heterocyclic group, a halogen atom, a hydroxy group, or a cyano group; and $R_5$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_6$-$C_{20}$ heteroaryl group, a substituted or unsubstituted $C_6$-$C_{20}$ heteroaryloxy group, a substituted or unsubstituted $C_6$-$C_{20}$ heteroarylalkyl group, a substituted or unsubstituted $C_4$-$C_{20}$ carbon ring group, a substituted or unsubstituted $C_4$-$C_{20}$ carbon ring alkyl group, a substituted or unsubstituted $C_2$-$C_{20}$ heterocyclic group, or a substituted or unsubstituted $C_2$-$C_{20}$ hetero ring alkyl group,

[Formula 12]

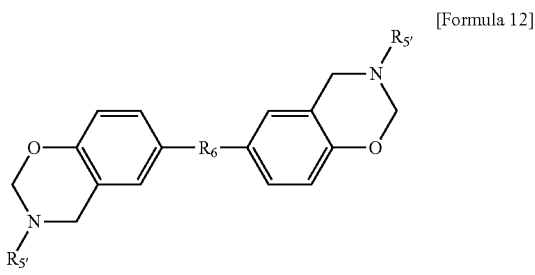

wherein in Formula 12, $R_5'$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_6$-$C_{20}$ heteroaryl group, a substituted or unsubstituted $C_6$-$C_{20}$ heteroaryloxy group, a substituted or unsubstituted $C_6$-$C_{20}$ heteroarylalkyl group, a substituted or unsubstituted $C_4$-$C_{20}$ carbon ring group, a substituted or unsubstituted $C_4$-$C_{20}$ carbon ring alkyl group, a substituted or unsubstituted $C_2$-$C_{20}$ heterocyclic group, or a substituted or unsubstituted $C_2$-$C_{20}$ hetero ring alkyl group; and $R_6$ is selected from the group consisting of a substituted or unsubstituted $C_1$-$C_{20}$ alkylene group, a substituted or unsubstituted $C_2$-$C_{20}$ alkenylene group, a substituted or unsubstituted $C_2$-$C_{20}$ alkynylene group, a substituted or unsubstituted $C_6$-$C_{20}$ arylene group, a substituted or unsubstituted $C_6$-$C_{20}$ heteroarylene group, —C(=O)—, and —SO$_2$—,

[Formula 13]

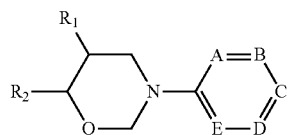

wherein in Formula 13, A, B, C, D and E are all carbon; or one or two of A, B, C, D and E are nitrogen (N) and the others are carbon (C), and $R_1$ and $R_2$ are linked to form a ring, wherein the ring is a $C_6$-$C_{10}$ carbon ring group, a $C_6$-$C_{10}$ heteroaryl group, a fused $C_6C_{10}$ heteroaryl group, a $C_3$-$C_{10}$ heterocyclic group or a fused $C_3$-$C_{10}$ heterocyclic group,

[Formula 15]

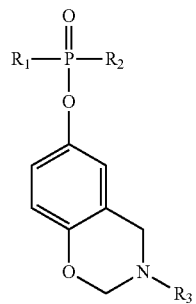

wherein in Formula 15, $R_1$ and $R_2$ are each independently a $C_1$-$C_{20}$ alkyl group, a $C_1$-$C_{20}$ alkoxy group, a $C_6$-$C_{20}$ aryl group, a $C_6$-$C_{20}$ aryloxy group or a group represented by Formula 15A below,

[Formula 15A]

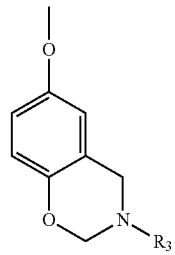

wherein in Formulae 15 and 15A, $R_3$ is each independently hydrogen, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_6$-$C_{20}$ heteroaryl group, a $C_6$-$C_{20}$ heteroaryloxy group, a halogenated $C_6$-$C_{20}$ heteroaryl group, a halogenated $C_6$-$C_{20}$ heteroaryloxy group, a $C_4$-$C_{20}$ carbon ring group, a halogenated $C_4$-$C_{20}$ carbon ring group, a $C_2$-$C_{20}$ heterocyclic group, or a halogenated $C_2$-$C_{20}$ heterocyclic group,

[Formula 16]

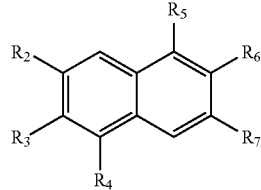

wherein in Formula 16, at least two adjacent groups selected from among $R_2$, $R_3$ and $R_4$ are linked to form a group represented by Formula 16A below, and the non-selected remaining group is hydrogen, a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_6$-$C_{20}$ heteroaryl group, a $C_6$-$C_{20}$ heteroaryloxy group, a halogenated $C_6$-$C_{20}$ heteroaryl group, a halogenated $C_6$-$C_{20}$ heteroaryloxy group, a $C_4$-$C_{20}$ carbon ring group, a halogenated $C_4$-$C_{20}$ carbon ring group, a $C_2$-$C_{20}$ heterocyclic group or a halogenated $C_2$-$C_{20}$ heterocyclic group, at least two adjacent groups selected from among $R_5$, $R_6$ and $R_7$ are linked to form the group represented by Formula 16A below, and the non-selected remaining group is a $C_1$-$C_{20}$ alkyl group, a $C_1$-$C_{20}$ alkoxy group, a $C_6$-$C_{20}$ aryl group, a $C_6$-$C_{20}$ aryloxy group, a halogenated $C_6$-$C_{20}$ aryl group, a halogenated $C_6$-$C_{20}$ aryloxy group, a $C_6$-$C_{20}$ heteroaryl group, a $C_6$-$C_{20}$ heteroaryloxy group, a halogenated $C_6$-$C_{20}$ heteroaryl group, a halogenated $C_6$-$C_{20}$ heteroaryloxy group, a $C_4$-$C_{20}$ carbon ring group, a halogenated $C_4$-$C_{20}$ carbon ring group, a $C_2$-$C_{20}$ heterocyclic group or a halogenated $C_2$-$C_{20}$ heterocyclic group,

[Formula 16A]

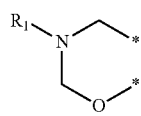

wherein in Formula 16A, $R_1$ is a substituted or unsubstituted $C_1$-$C_{20}$ alkyl group, a substituted or unsubstituted $C_1$-$C_{20}$ alkoxy group, a substituted or unsubstituted $C_2$-$C_{20}$ alkenyl group, a substituted or unsubstituted $C_2$-$C_{20}$ alkynyl group, a substituted or unsubstituted $C_6$-$C_{20}$ aryl group, a substituted or unsubstituted $C_6$-$C_{20}$ aryloxy group, a substituted or unsubstituted $C_7$-$C_{20}$ arylalkyl group, a substituted or unsubstituted $C_6$-$C_{20}$ heteroaryl group, a substituted or unsubstituted $C_6$-$C_{20}$ heteroaryloxy group, a substituted or unsubstituted $C_6$-$C_{20}$ heteroarylalkyl group, a substituted or unsubstituted $C_4$-$C_{20}$ carbon ring group, a substituted or unsubstituted $C_4$-$C_{20}$ carbon ring alkyl group, a substituted or unsubstituted $C_2$-$C_{20}$ heterocyclic group, or a substituted or unsubstituted $C_2$-$C_{20}$ heterocyclic alkyl group, and

* denotes the sites at which the at least two adjacent groups selected from among $R_2$, $R_3$ and $R_4$ of Formula 16 and the at least two adjacent groups selected from among $R_5$, $R_6$ and $R_7$ are linked, respectively.

14. The cross-linked hyper-branched polymer of claim 12, further comprising a cross-linking compound in the hyper-branched polymer composition.

15. The cross-linked hyper-branched polymer of claim 14, wherein the cross-linking compound comprises at least one compound selected from the group consisting of polybenzimidazoles (PBI), polybenzthiazoles, polybenzoxazoles, and polyimides.

16. A hyper-branched polymer composition comprising the hyper-branched polymer of claim 1 and a monomer repersenetd by Formula 14

[Formula 14]

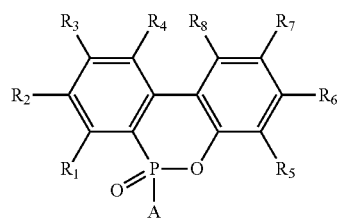

wherein in Formula 14, A is a substituted or unsubstituted $C_6$-$C_{20}$ heterocyclic group, a substituted or unsubstituted $C_6$-$C_{20}$ cycloalkyl group, or a substituted or unsubstituted $C_1$-$C_{20}$ alkyl group; and $R_1$ through $R_8$ are each independently hydrogen, a $C_1$-$C_{20}$ alkyl group, a $C_1$-$C_{20}$ alkoxy group, a $C_6$-$C_{20}$ aryl group, a $C_6$-$C_{20}$ aryloxy group, a $C_6$-$C_{20}$ heteroaryl group, a $C_6$-$C_{20}$ heteroaryloxy group, a $C_6$-$C_{20}$ cycloalkyl group, a $C_6$-$C_{20}$ heterocyclic group, a halogen atom, a cyano group, or a hydroxy group.

17. A cross-linked hyper-branched polymer, which is a product of a cross-linking reaction of the hyper-branched polymer composition of claim 16.

18. An electrode for a fuel cell comprising the hyper-branched polymer of any one of claims 1 through 5.

19. The electrode of claim 18, further comprising a second hyper-branched polymer represented by Formula 17 below;

[Formula 17]

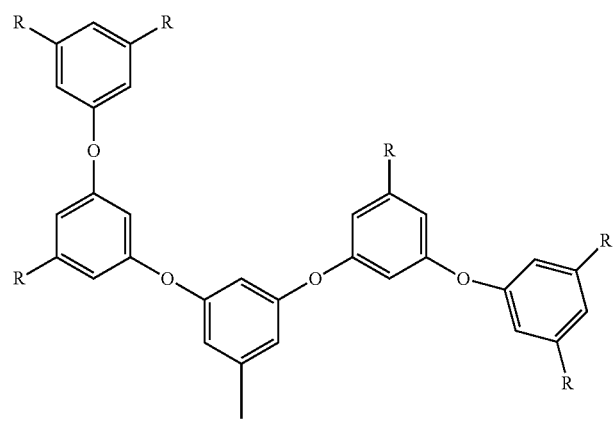

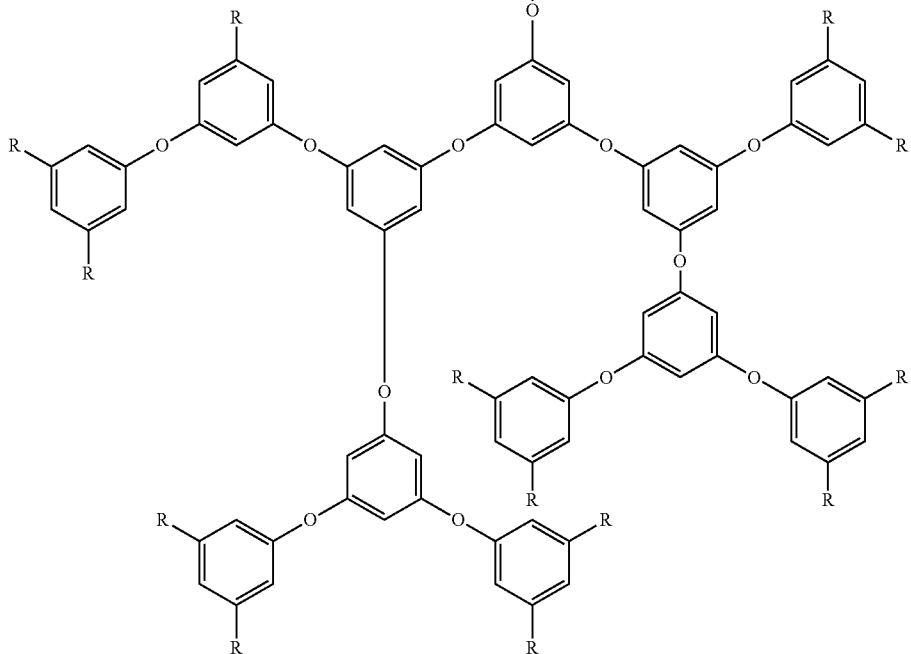

wherein in Formula 17, R is fluorine, a trifluoromethyl group, a 3,5-difluorophenyl group, or a compound selected from the groups represented by the following formulae:

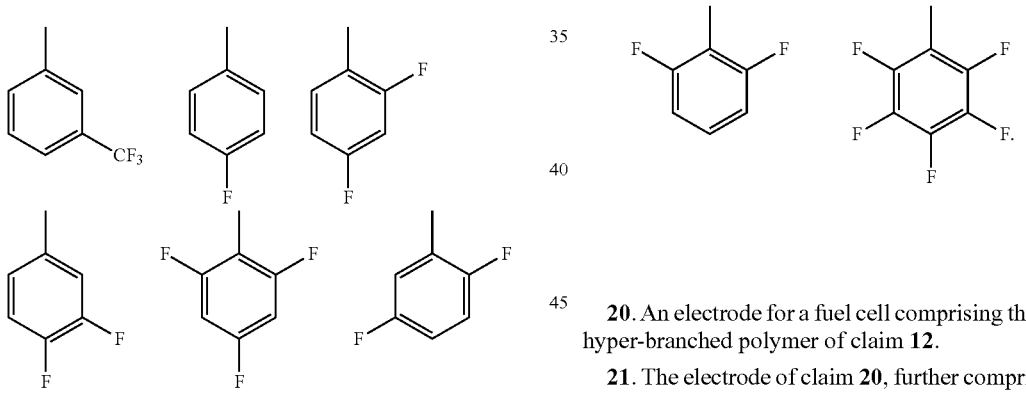

20. An electrode for a fuel cell comprising the cross-linked hyper-branched polymer of claim 12.

21. The electrode of claim 20, further comprising a second hyper-branched polymer represented by Formula 17 below.

[Formula 17]

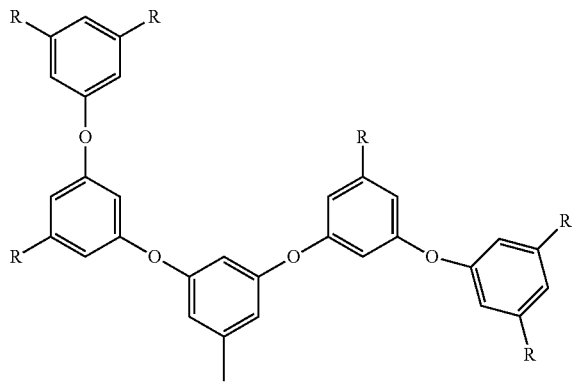

-continued

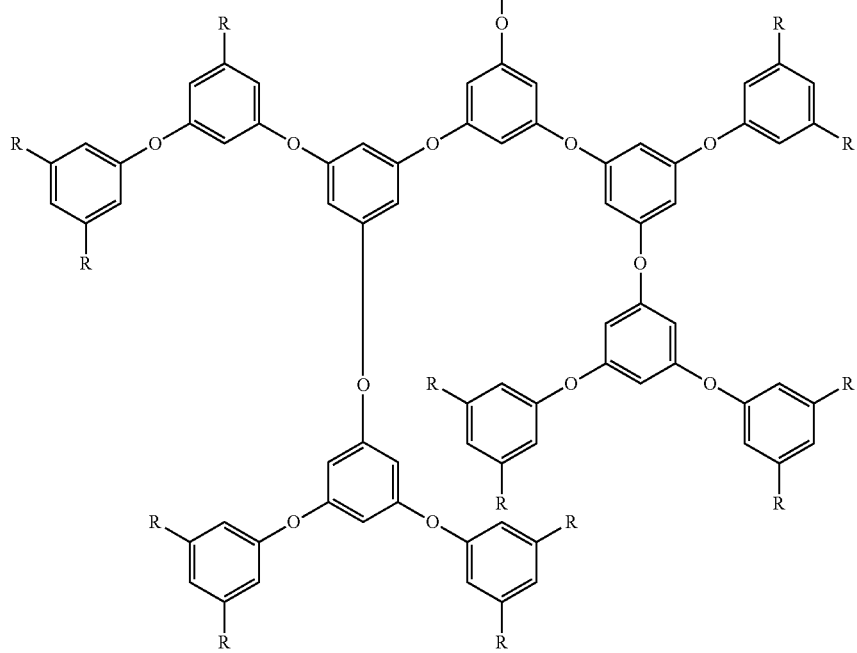

wherein in Formula 17, R is fluorine, a trifluoromethyl group, a 3,5-difluorophenyl group, or a compound selected from the groups represented by the following formulae:

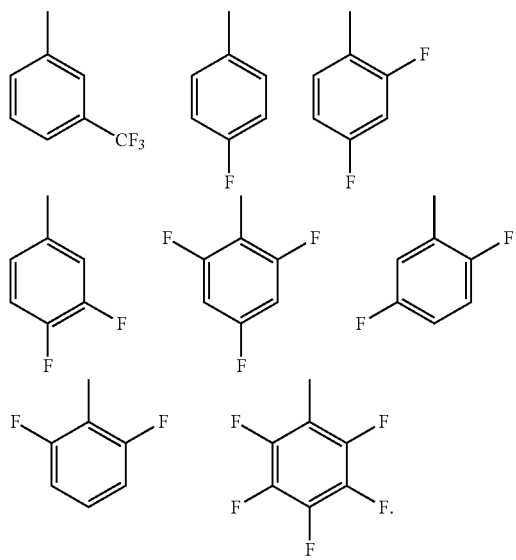

22. An electrolyte membrane for a fuel cell, the electrolyte membrane comprising the hyper-branched polymer of claim 1.

23. An electrolyte membrane for a fuel cell, the electrolyte membrane comprising the cross-linked hyper-branched polymer of claim 12.

24. A fuel cell comprising:
a cathode;
an anode; and
an electrolyte membrane disposed between the cathode and the anode,
wherein at least one of the cathode, the anode, and the electrolyte membrane comprises the hyper-branched polymer of claim 1.

25. A fuel cell comprising:
a cathode;
an anode; and
an electrolyte membrane disposed between the cathode and the anode,
wherein at least one of the cathode, the anode, and the electrolyte membrane comprises the cross-linked hyper-branched polymer of claim 12.

* * * * *